United States Patent [19]

Nagano

[11] Patent Number: 5,798,876
[45] Date of Patent: Aug. 25, 1998

US005798876A

[54] LENS BARREL WITH PERIPHERAL PARTS OF FIRST AND SECOND LENSES IN CONTACT

[75] Inventor: Masatoshi Nagano, Tokyo, Japan

[73] Assignee: Canon Kabushiki Kaisha, Tokyo, Japan

[21] Appl. No.: 597,269

[22] Filed: Feb. 6, 1996

[30] Foreign Application Priority Data

Feb. 9, 1995 [JP] Japan .................. 7-044748
Mar. 29, 1995 [JP] Japan .................. 7-096096

[51] Int. Cl.$^6$ ...................................... G02B 07/02
[52] U.S. Cl. .............................................. 359/819
[58] Field of Search .......................... 359/819, 820; 396/529

[56] References Cited

U.S. PATENT DOCUMENTS

| | | | |
|---|---|---|---|
| 3,784,287 | 1/1974 | Grey | 359/819 |
| 3,904,276 | 9/1975 | Whitaker | 359/819 |
| 4,258,982 | 3/1981 | Skinner | 359/819 |
| 4,303,306 | 12/1981 | Ookawa | 359/819 |
| 4,488,776 | 12/1984 | Skinner | 359/819 |
| 4,662,717 | 5/1987 | Yamada | 359/819 |
| 4,886,342 | 12/1989 | Kudo | 359/819 |
| 5,052,782 | 10/1991 | Myer | 359/827 |
| 5,161,061 | 11/1992 | Ihara | 359/708 |
| 5,177,641 | 1/1993 | Kobayashi | 359/820 |
| 5,353,166 | 10/1994 | Hanford | 359/819 |
| 5,483,383 | 1/1996 | Uziie | 359/819 |
| 5,557,474 | 9/1996 | McCrary | 359/820 |
| 5,612,826 | 3/1997 | Oshita | 359/819 |

FOREIGN PATENT DOCUMENTS 60-107812  7/1985  Japan .
63-115110  6/1988  Japan .

OTHER PUBLICATIONS

Robert E. Hopkins, "Lens Mounting and Centering", Applied Optics and Optical Engineering, vol. III, pp. 35–36. 1980.

*Primary Examiner*—Georgia Y. Epps
*Assistant Examiner*—Ricky Mack
*Attorney, Agent, or Firm*—Fitzpatrick, Cella, Harper & Scinto

[57] ABSTRACT

In a lens barrel including a first lens and a second lens, respective peripheral parts of the first lens and the second lens are in contact with each other while respective central parts of the first lens and the second lens are distant from each other. Each of the peripheral parts of the first lens and the second lens has a curved surface, and the respective curved surfaces substantially coincide with each other.

80 Claims, 10 Drawing Sheets

LENS BARREL WITH PERIPHERAL PARTS OF FIRST AND SECOND LENSES IN CONTACT

BACKGROUND OF THE INVENTION

1. Field of the Invention

This invention relates to a lens barrel and an optical apparatus having the lens barrel, and more particularly to a lens barrel of the kind having two lenses kept in marginal contact with each other and an optical apparatus using the lens barrel, such as a video camera, a photographic camera, an optical measuring apparatus or the like.

2. Description of the Related Art

It has been known to hold two lenses in marginal contact with each other within a lens barrel in an optical system composed of a plurality of lenses. FIG. 1 shows, in a sectional view, essential parts of a lens barrel of such a marginal contact structure.

Referring to FIG. 1, lenses 1 and 2 are made of a glass material. The lenses 1 and 2 are held by a part of a lens tube 3, which is made of a resin (plastic) material. Reference numeral 4 denotes an optical axis. The lenses 1 and 2 have tube-contacting parts 1a and 2a, which are respectively attached to the lens tube 3 in such a manner that the center of the lens 1 and that of the lens 2 respectively coincide with the optical axis 4. Further, the lens 1 has a marginal contact part 1b, which is kept in contact with the lens 2, so that a spacing distance between the lenses 1 and 2 is determined with a high degree of precision. Furthermore, the lenses 1 and 2 are fixed so as not to move in the direction of the optical axis 4, by caulking the lens tube 3.

However, according to the conventional marginal contact structure, the stress of the lenses concentrates on the marginal contact parts as the two lenses are in linear contact with each other. Therefore, if a lens of a low rigidity is employed as one of the two lenses, the lens surface of that lens would be distorted to deteriorate the optical performance of the lens barrel.

Further, in the case of the conventional lens barrel shown in FIG. 1, a right-hand curved surface of the lens 2 and an edge part 3a of the lens tube 3 are in linear contact with each other. The stress of the lens 2, therefore, concentrates on its part which is in contact with the edge part 3a, and thus there arises the same problem as the marginal contact.

SUMMARY OF THE INVENTION

It is an object of this invention to provide a lens barrel and an optical apparatus having the lens barrel, which is capable of eliminating or minimizing the deterioration of an optical performance thereof.

In accordance with a first aspect of this invention, a lens barrel or an optical apparatus comprises a first lens and a second lens, in which respective peripheral parts of the first lens and the second lens are in contact with each other, respective central parts of the first lens and the second lens are distant from each other, each of the peripheral parts of the first lens and the second lens has a curved surface, and the respective curved surfaces of the first lens and the second lens substantially coincide with each other.

In accordance with a second aspect of this invention, a lens barrel or an optical apparatus comprises a lens and a tube for accommodating the lens, wherein the tube has a receiving part arranged to receive a curved surface of a contact part of the lens, the receiving part of the tube has a curved surface, and the respective curved surfaces of the receiving part and the contact part substantially coincide with each other.

In accordance with a third aspect of this invention, a lens barrel or an optical apparatus comprises a first lens, a second lens and a tube arranged to hold the first lens and the second lens, wherein an outer diameter of the first lens is smaller than an inner diameter of a corresponding part of the tube, and the first lens is held by sandwiching the first lens between the second lens and a receiving part of the tube.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
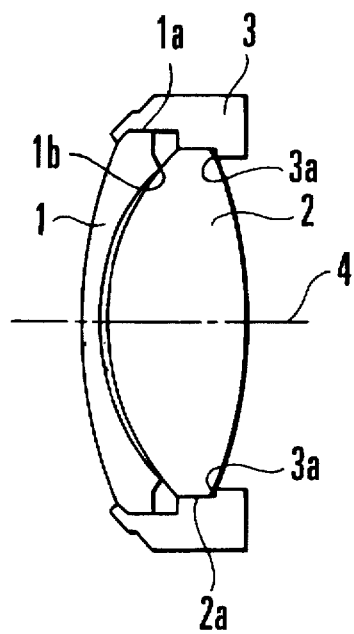
FIG. 1 is a sectional view showing in outline essential parts of the conventional lens barrel.
Figure 2:
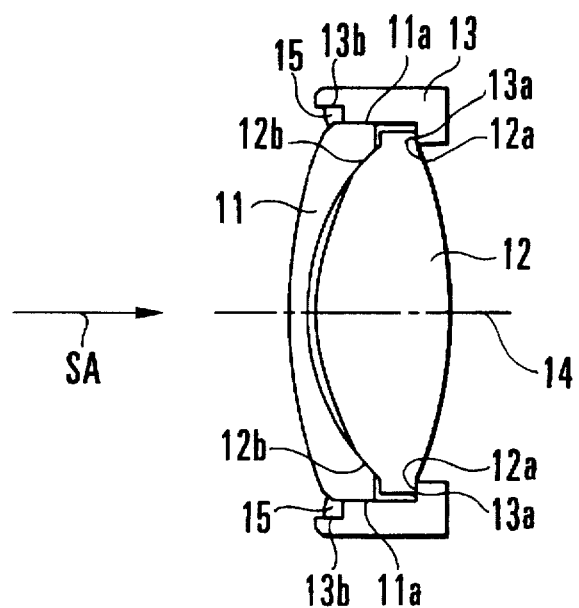
FIG. 2 is a sectional view showing essential parts of a first embodiment of this invention.
Figure 3:
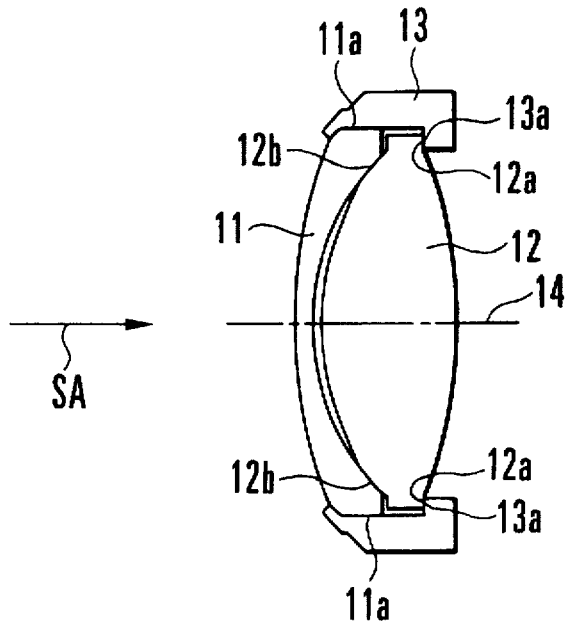
FIG. 3 is a sectional view showing also the essential parts of the first embodiment.

FIGS. 2 and 3 are sectional views respectively showing essential parts of a lens barrel arranged as a first embodiment of this invention. The lens barrel is adapted for an optical apparatus such as a video camera, a silver-halide photographic camera, an interchangeable lens, or the like.

Referring to FIGS. 2 and 3, a lens 11 is made of a glass material. A lens 12 is made of a plastic material. In the case of this embodiment, the lenses 11 and 12 are brought into marginal contact with each other in a manner as will be described later herein. (The term "marginal contact" as used here means a state of contact only at peripheral parts of the two lenses without allowing their central parts to be in contact with each other). The lens 11 and the plastic lens 12 are held by a lens tube 13. The plastic lens 12 is provided with a contact part 12a for contact with the lens tube 13 and a part (or an equal curvature area) 12b which has the same curvature as that of the lens surface of the right side (on the marginal contact side) of the lens 11. The plastic lens 12 is arranged to be in marginal contact with the lens 11 at this curved surface part 12b. The lens 11 has a fitting part 11a which is arranged along its periphery to be fitted in the lens tube 13, to serve as a guide for movement in parallel to an optical axis and to permit positioning in a direction perpendicular to the optical axis.

The lens tube 13 has a receiving face 13a for receiving the plastic lens 12 and a space 13b for applying an adhesive 15. An optical system which is composed of the lens 11 and the plastic lens 12 has an optical axis 14. The adhesive 15 is applied to fix the lens 11 to the lens tube 13. The plastic lens 12 and the lens tube 13 are in contact with each other on the contact part 12a and the receiving face 13a only in a direction parallel to the optical axis 14 and leave a clearance between them in a direction perpendicular to the optical axis 14, as the diameter of the lens 12 is smaller than the inner diameter of the lens tube 13.

The first embodiment is assembled in the following manner. The plastic lens 12 is first inserted into the lens tube 13 from the direction of arrow SA as shown in the drawing in such a way as to bring the contact part 12a of the plastic lens 12 into contact with the receiving face 13a. Subsequently, the lens 11 is inserted from the direction of arrow SA to bring its lens surface on its right side into contact with the part 12b of the plastic lens 12. Since the plastic lens 12 is apt to be deformed if its peripheral part is fitted into or inserted with pressure into the lens tube 13, the outer diameter of the plastic lens 12 is set smaller than the inner diameter of the lens tube 13. Further, the contact part 12a and the receiving face 13a are arranged to extend perpendicular to the optical axis 14. Therefore, with the lens tube 13 fixed, when a load is applied to the lens 11 in the direction of arrow SA, the lens 11 can be fitted into the lens tube 13 at its peripheral part 11a and moved to the right as viewed on the drawing in parallel to the optical axis 14, without slanting to any tangible degree relative to the optical axis 14, until the lens 11 comes into contact with the plastic lens 12.

When a load is applied further to the lens 11, the position of the plastic lens 12 is restricted, in the direction which is in parallel to the optical axis, by the receiving face 13a and the curved surface of the right side of the lens 11 as viewed on the drawing. As a result, the plastic lens 12 is caused to move perpendicular to the optical axis 14 to bring about a state in which the centers of both the lens 11 and the plastic lens 12 coincide with the optical axis 14. After that, the adhesive 15 is injected into the space 13b as shown in FIG. 2 to secure the lens 11 to the lens tube 13. Then, as shown in FIG. 3, the lens 11 is fixed in position by caulking the lens tube 13.

In the case of the first embodiment shown in FIGS. 2 and 3, the plastic lens 12 is not directly secured to the lens tube 13 by means of the adhesive 15 or the like. However, the plastic lens 12 never comes to deviate from its position as it is sandwiched in between the lens 11 and the lens tube 13.

Further, in a case where, in the first embodiment shown in FIGS. 2 and 3, the plastic lens 12 and the lens tube 13 greatly differ from each other in coefficient of linear expansion or the like, an elastic adhesive which is elastically deformable after it is applied is preferably employed as the adhesive 15. Such an adhesive absorbs the expansion and contraction of the plastic lens 12 caused by heat or the like to prevent the plastic lens 12 from deforming. Further, since the embodiment shown in FIGS. 2 and 3 is arranged not to fix the plastic lens 12 to the lens tube 13 with any adhesive, the plastic lens 12 is never deformed by the contraction of the adhesive taking place at the time of setting of the adhesive.

In a case where the linear expansion coefficient of the material used for forming the lens tube 13 does not much differ from those of the materials used for forming the plastic lens 12 and the lens 11, or where the elasticity of the lens tube 13 is larger than those of the plastic lens 12 and the lens 11, the lens 11 and the plastic lens 12 are preferably fixed in position by caulking the lens tube 13 as shown in FIG. 3. Further, the lens 11 and the plastic lens 12 may be arranged to be held by a retaining ring or a C ring in a known manner.

In the case of the first embodiment, the lens 11 is arranged to be a negative lens of a meniscus shape with its convex shape on the left side as viewed on the drawing and the plastic lens 12 to be a positive lens having convex surfaces on both sides of it. However, this arrangement may be changed to arrange the lens 11 to be a positive lens having convex surfaces on both sides and the plastic lens 12 to be a negative lens of a meniscus shape having a convex surface on its right side, as long as the two lens surfaces to be in marginal contact with each other are concave and convex surfaces.

FIGS. 4, 5, 6 and 7 are sectional views showing respectively essential parts of lens barrels which are arranged according to this invention as second, third, fourth and fifth embodiments thereof. Each of these lens barrels is adapted for a video camera, a photographic camera using a silver halide film, an interchangeable lens or the like.

Figure 4:
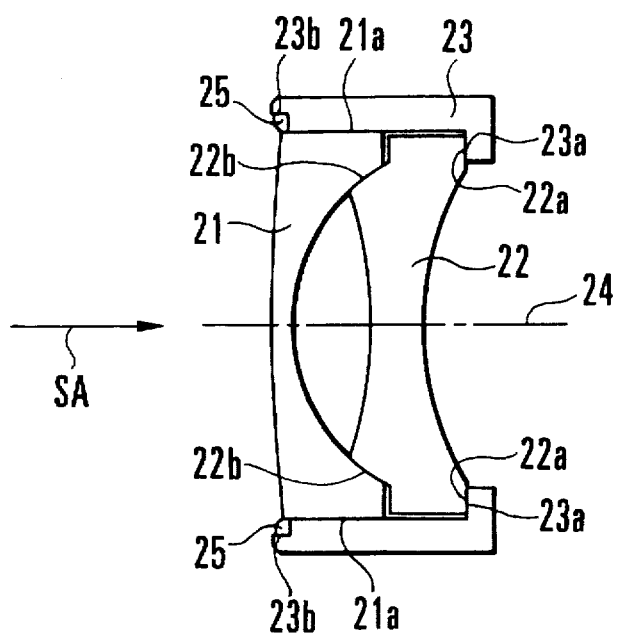
FIG. 4 is a sectional view showing essential parts of a second embodiment of this invention.

In the case of the lens barrel of FIG. 4 which is the second embodiment, a lens 21 is made of a glass material. A plastic lens 22 is arranged to be in marginal contact with the lens 21 in a manner as will be described later herein. A lens tube 23 holds the lens 21 and the plastic lens 22. The plastic lens 22 is provided with a contact part 22a which is in contact with the lens tube 23 and a curved surface part 22b which has the same curvature as the curvature of the curved surface of the lens 21 on its right side. At this part 22b, the lens 21 is in marginal contact with the plastic lens 22.

The lens 21 has a fitting part 21a along its periphery. The fitting part 21a is fitted into the lens tube 23 and is arranged to guide movement in parallel to an optical axis 24 and to permit positioning in a direction perpendicular to the optical axis 24. The lens tube 23 is provided with a receiving face 23a for receiving the plastic lens 22 and a space 23b for an adhesive 25. The adhesive 25 is applied to the space 23b for securing the lens 21 to the lens tube 23. The plastic lens 22 and the lens tube 23 are arranged to be in contact with each other only in the direction of the optical axis at the contact part 22a and the receiving face 23a. Since the diameter of the lens 22 is smaller than the inner diameter of the lens tube 23, a clearance is left in a direction perpendicular to the optical axis 24.

The second embodiment is assembled in the following manner. The plastic lens 22 is first inserted in the lens tube 23 from the direction of arrow SA as shown in the drawing in such a way as to bring the contact part 22a of the plastic lens 22 into contact with the receiving face 23a. Subsequently, the lens 21 is inserted from the direction of arrow SA to bring its lens surface on the right side into contact with the part 22b of the plastic lens 22. Since the plastic lens 22 is apt to be deformed if its peripheral part is fitted or inserted with pressure into the lens tube 23, the outer diameter of the plastic lens 22 is arranged to be smaller than the inner diameter of the lens tube 23. The contact part 22a and the receiving face 23a are arranged to extend perpendicular to the optical axis 24.

With the lens tube 23 fixed, when a load is applied to the lens 21 in the direction of arrow SA, the lens 21 moves to the right as viewed on the drawing in parallel to the optical axis 24, without slanting to any tangible degree relative to the optical axis 24 as it is fitted into the lens tube 23, until the lens 21 comes into contact with the plastic lens 22. When a load is applied further to the lens 21, the plastic lens 22 is restricted by the receiving face 23a and the curved surface of the right side of the lens 21 and is thus caused to move perpendicular to the optical axis 24. As a result, both the center of the lens 21 and that of the plastic lens 22 come to coincide with the optical axis 24. Then, the adhesive 25 is injected into the space 23b to fix the lens 21 to the lens tube 23. A state thus obtained is as shown in FIG. 4.

The plastic lens 22 is not directly secured to the lens tube 23 by means of the adhesive 25 or the like. However, the plastic lens 22 never comes to deviate from its position as it is sandwiched in between the lens 21 and the lens tube 23. Further, in a case where the plastic lens 22 and the lens tube 23 greatly differ from each other in coefficient of linear expansion or the like, an elastic adhesive of the kind mentioned in the foregoing is preferably employed as the adhesive 25. The elastic adhesive absorbs the expansion and contraction of the plastic lens 22 caused by heat or the like to prevent the plastic lens 22 from deforming. Further, since the plastic lens 22 is not directly fixed in position by the adhesive 25, the plastic lens 22 is prevented from being deformed by the contraction of the adhesive 25 taking place at the time of the setting of the adhesive.

In a case where the linear expansion coefficient of the material used for forming the lens tube 23 does not much differ from those of the materials used for forming the plastic lens 22 and the lens 21, or where the elasticity of the lens tube 23 is larger than those of the plastic lens 22 and the lens 21, the lens 21 and the plastic lens 22 may be fixed in position by caulking the lens tube 23 like in the case of the first embodiment shown in FIG. 3. Further, the lens 21 and the plastic lens 22 may be arranged to be held by a retaining ring or a C ring in a known manner.

In the case of the second embodiment, the lens 21 is arranged to be a negative lens of a meniscus shape with its convex shape on the left side as viewed on the drawing and the plastic lens 22 to be a negative lens having concave surfaces on both sides of it. However, this arrangement may be changed to arrange the lens 21 and the plastic lens 22 to be in any shapes, as long as the two lens surfaces to be in marginal contact with each other are concave surfaces which are opposed to each other.

Figure 5:
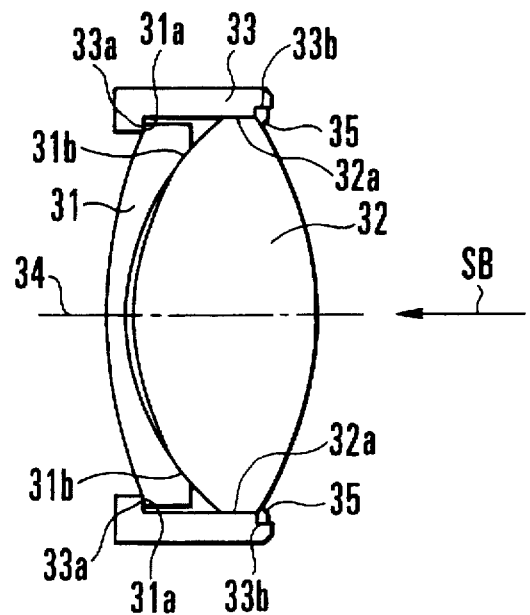
FIG. 5 is a sectional view showing essential parts of a third embodiment of this invention.

The third embodiment which is shown in FIG. 5 is arranged as follows. In this case, the glass lens 11 of the first embodiment which is in a meniscus shape with a convex surface on the left side is replaced with a plastic lens 31 of the same shape while the plastic lens 12 of the first embodiment which has convex surfaces on its both sides is replaced with a lens 32 which is made of a hard material such as a glass material and which is formed in the same shape as the plastic lens 12.

Referring to FIG. 5, a lens tube 33 holds the plastic lens 31 and the lens 32 which is made of a hard material such as a glass material. The lens tube 33 has an optical axis 34. An adhesive 35 is used for securing the lens 32 to the lens tube 33. The plastic lens 31 has a contact part 31a which is in contact with the lens tube 33 and a part 31b which has the same curvature as the curvature of the left curved surface of the lens 32. The plastic lens 31 is in contact (marginal contact) with the lens 32 at this curved surface part 31b.

The lens 32 has a fitting part 32a along its peripheral part. The fitting part 32a acts to perform a guiding action in parallel to the optical axis 34 and a positioning action in a direction perpendicular to the optical axis 34. The lens tube 33 has a receiving face 33a which is arranged to receive the plastic lens 31 and a space 33b which is arranged to have the adhesive 35 applied thereto. The plastic lens 31 is arranged to be in contact with the lens tube 33 at its contact part 31a only in the direction of the optical axis. The diameter of the plastic lens 31 is smaller than the inner diameter of the lens tube 33 to leave a clearance between them in a direction perpendicular to the optical axis 34.

The third embodiment is assembled in the following manner. The plastic lens 31 is first inserted into the lens tube 33 from the direction of arrow SB in such a way as to bring the contact part 31a into contact with the receiving face 33a. The lens 32 is next inserted into the lens tube 33 from the direction of arrow SB to bring its left surface into contact with the part 31b of the plastic lens 31. The plastic lens 31 might be deformed if the plastic lens 31 is fitted into or inserted with pressure into the lens tube 33 at its peripheral part. To avoid such deformation, the diameter of the plastic lens 31 is arranged to be smaller than the inner diameter of the lens tube 33.

The contact part 31a and the receiving face 33a extend perpendicular to the optical axis 34. Therefore, when a load is applied to the lens 32 in the direction of arrow SB, the lens 32 moves to the left as viewed on the drawing, without much slanting relative to the optical axis 34 as the lens 32 is fitted into the lens tube 33, until the lens 32 comes into contact with the plastic lens 31. When a load is applied further to the lens 32, the receiving face 33a and the curved surface of the left side of the lens 32 restrict the motion of the plastic lens 31 to cause the plastic lens 31 to move perpendicular to the optical axis 34. As a result, there is obtained a state in which the center of the lens 32 and that of the plastic lens 31 coincide with the optical axis 34. Then, the adhesive 35 is injected into the space 33b to secure the lens 32 to the lens tube 33 to bring about a state as shown in FIG. 5.

Although the plastic lens 31 is not directly fixed to the lens tube 33 by means of the adhesive 35 or the like, the plastic lens 31 never deviates from its position as it is sandwiched in between the lens 32 and the lens tube 33. Further, in a case where the linear expansion coefficient or the like of the plastic lens 31 greatly differs from that of the lens tube 33, an elastic adhesive is preferably employed as the adhesive 35 as mentioned in the foregoing. The use of the elastic adhesive absorbs the expansion or contraction of the plastic lens 31 caused by heat or the like, so that the plastic lens 31 can be prevented from being deformed by heat or the like.

In a case where the linear expansion coefficient of the material used for forming the lens tube 33 does not much differ from those of the materials used for forming the plastic lens 31 and the lens 32, or where the elasticity of the lens tube 33 is larger than those of the plastic lens 31 and the lens 32, the plastic lens 31 and the lens 32 may be fixed in position by caulking the lens tube 33 like in the case of the first embodiment shown in FIG. 3. Further, the plastic lens 31 and the lens 32 may be arranged to be held by a retaining ring or a C ring in a known manner.

Figure 6:
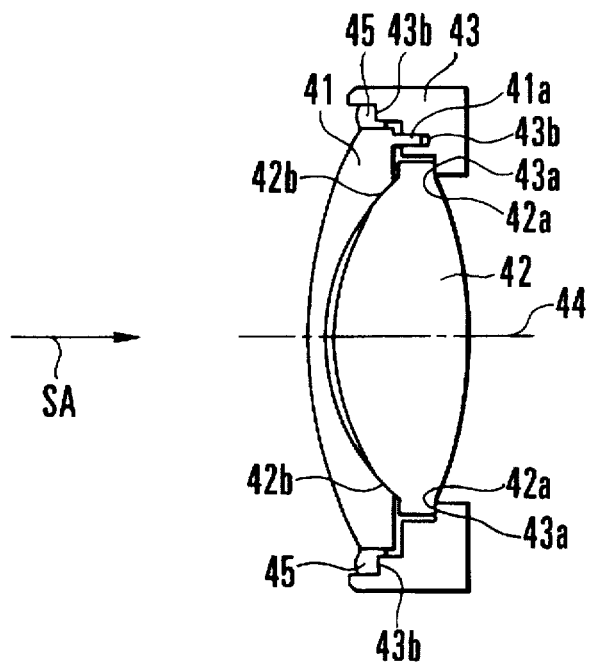
FIG. 6 is a sectional view showing essential parts of a fourth embodiment of this invention.

The fourth embodiment which is shown in FIG. 6 is arranged as follows. Referring to FIG. 6, lenses 41 and 42 each are made of a plastic material. A lens tube 43 is arranged to hold the plastic lenses 41 and 42. Reference numeral 44 denotes an optical axis. An adhesive 45 is used for securing the plastic lens 41 to the lens tube 43. The plastic lens 41 has at least one dowel 41a, which is formed in parallel to the optical axis 44 and is fitted into a hole part 43b which is formed in the lens tube 43 in parallel to the optical axis 44. The positional relation between the lens tube 43 and the plastic lens 41 is determined by the dowel 41a and the hole part 43b.

The plastic lens 42 has a contact part 42a which is in contact with the lens tube 43 and a part 42b which has the same curvature as a curved surface of the right side of the lens 41. The plastic lenses 41 and 42 are in marginal contact with each other at this part 42b. The lens tube 43 is provided with a space 43b for having the adhesive 45 injected therein to secure the plastic lens 41 to the lens tube 43. The lens tube 43 has a receiving face 43a which is arranged to receive the plastic lens 42. The plastic lens 42 is in contact with the lens tube 43 at this receiving face 43a and the contact part 42a only in the direction of the optical axis 44. There is a clearance left between the lens tube 43 and the plastic lens 42 in a direction perpendicular to the optical axis. The plastic lens 41 is fitted into the lens tube 43 solely by means of the dowel 41a.

In the case of the fourth embodiment, the lens 11 of the first embodiment is replaced with the plastic lens 41. While the first embodiment is arranged to position the lens 11 and the lens tube 13 in the direction perpendicular to the optical axis 14 by fitting the peripheral part of the lens 11 into the inner circumferential part of the lens tube 13, the fourth embodiment is arranged to perform the positioning action by fitting the dowel 41a of the plastic lens 41 into the hole part 43b of the lens tube 43.

The fourth embodiment is assembled in the following manner. The plastic lens 42 is first inserted into the lens tube 43 from the direction of arrow SA in such a way as to bring the contact part 42a into contact with the receiving face 43a. The plastic lens 41 is next inserted into the lens tube 43 from the direction of arrow SA to fit the dowel 41a into the hole part 43b and to bring its right surface into contact with the part 42b of the plastic lens 42. The plastic lenses 41 and 42 might be deformed if they are fitted into or inserted with pressure into the lens tube 43 at their peripheral parts. To avoid such deformation, the diameters of the plastic lenses 41 and 42 are arranged to be smaller than the inner diameters of corresponding parts of the lens tube 43. The contact part 42a and the receiving face 43b are arranged to extend perpendicular to the optical axis 44.

When a load is applied to the plastic lens 41 from the direction of arrow SA with the lens tube 43 fixed, the plastic lens 41 comes into contact with the plastic lens 42 by moving to the right in parallel to the optical axis 44 without slanting relative to the optical axis 44 as the dowel 41a which extends in parallel to the optical axis 44 is fitted in the hole part 43b. When a load is applied further to the plastic lens 41, the receiving face 43a and the curved surface of the left side of the plastic lens 41 restrict the motion of the plastic lens 42 so as to cause the plastic lens 42 to move perpendicular to the optical axis 44. As a result, there is obtained a state in which the center of the plastic lens 41 and that of the plastic lens 42 coincide with the optical axis 44. Then, the adhesive 45 is injected into the space 43b to secure the plastic lens 41 to the lens tube 43 to bring about a state as shown in FIG. 6.

The adhesive 45 never flows in between the plastic lenses 41 and 42 as they are in contact with each other along their peripheral parts. Although the plastic lens 42 is not fixed directly to the lens tube 43 with any adhesive or the like, the plastic lens 42 never deviates from its position as it is sandwiched in between the plastic lens 41 and the lens tube 43. In a case where the coefficient of linear expansion of the plastic lenses 41 and 42 greatly differs from that of the lens tube 43, the elastic adhesive mentioned above is preferably employed as the adhesive 45. The expansion and contraction of the plastic lenses 41 and 42 due to heat then can be absorbed by the elastic adhesive 45. Further, in order to prevent the plastic lens 41 from deforming when the adhesive 45 is applied, the adhesive 45 is preferably selected from among adhesives which do not much contract in setting.

In the fourth embodiment, the plastic lens 42 is arranged to have the curved surface part 42b which has the same curvature as the curvature of the curved surface of the right side of the plastic lens 41. However, this arrangement may be variously changed, for example, to arrange the peripheral part of the right-side curved surface of the plastic lens 41 to have the same curvature as the curvature of the left-side curved surface of the plastic lens 42, to arrange the peripheral part of the right-side curved surface of the plastic lens 41 and the peripheral part of the left-side curved surface of the plastic lens 41 to have curved surface parts which are of the same curvature but differ from the curvature of the right-side curved surface of the plastic lens 41 and that of the left-side curved surface of the plastic lens 42, or to form these parts to have tapered or slanting faces extending not orthogonally intersecting the optical axis 44. The advantageous effect of the embodiment can be attained also by these modifications.

Figure 7:
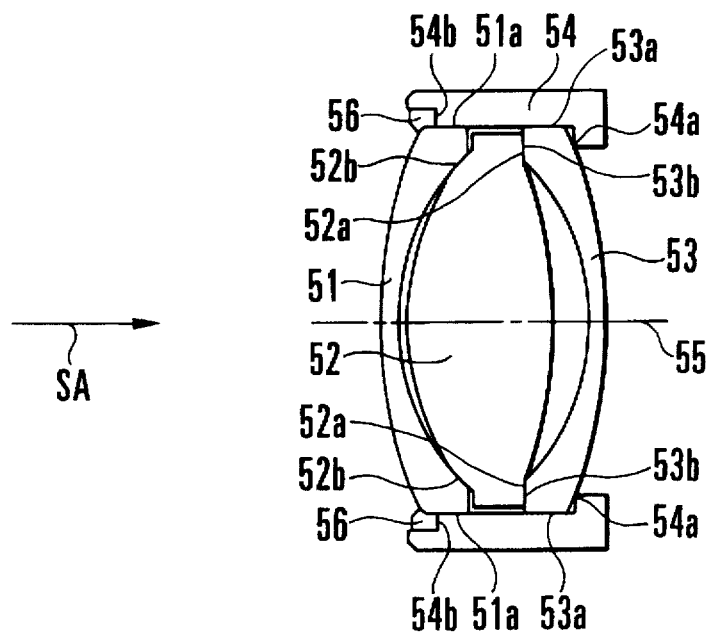
FIG. 7 is a sectional view showing essential parts of a fifth embodiment of this invention.

The fifth embodiment which is shown in FIG. 7 is next described as follows.

Referring to FIG. 7, lenses 51 and 53 each are made of a glass material. A lens 52 is made of a plastic material. A lens tube 54 is arranged to hold the lenses 51 and 53 and the plastic lens 52. Reference numeral 55 denotes an optical axis. Reference numeral 56 denotes an adhesive. The plastic lens 52 has a contact part 52a which is in contact with the lens 53 and a curved surface part 52b which has the same curvature as the curved surface of the right side of the lens 51. The lens 51 is in marginal contact with the plastic lens 52 at this part 52b.

The lenses 51 and 53 are provided with fitting parts 51a and 53a in their peripheral parts for fitting into the lens tube 54. The lens 53 has a contact part 53b which is in contact with the contact part 52a of the plastic lens 52. The lens tube 54 is provided with a receiving part 54a for receiving the lens 53 and a space 54b for the adhesive 56. The plastic lens 52 is in contact with the lens 51 at the part 52b only in the direction of the optical axis 55 and in contact with the lens 53 at the contact part 52a. Since the diameter of the plastic lens 52 is smaller than the inner diameter of the lens tube 54, there is a clearance between the plastic lens 52 and the lens tube 54 in a direction perpendicular to the optical axis 55.

The fifth embodiment is assembled in the following manner. The lens 53 is first inserted into the lens tube 54 from the direction of arrow SA in such a way as to have the contact part 53b located on the left side as viewed on the drawing and to bring the curved surface of its right side into contact with the receiving part 54a of the lens tube 54. The plastic lens 52 is next inserted to bring the contact part 52a into contact with the contact part 53b of the lens 53. Subsequently, the lens 51 is inserted to bring the right-side curved surface of the lens 51 into contact with the part 52b of the plastic lens 52.

The plastic lens 52 might be deformed if the peripheral part of the plastic lens 52 is fitted or inserted with pressure into the lens tube 54. To avoid such deformation, the outer diameter of the plastic lens 52 is arranged to be smaller than the inner diameter of the lens tube 54. The contact parts 52a and 53b are arranged to extend perpendicular to the optical axis 55. When a load is applied to the lens 51 in the direction of arrow SA with the lens tube 54 fixed, the lens 51 moves to the right as viewed on the drawing in parallel to the optical axis 55 almost without slanting relative to the optical axis 55 as the lens 51 is fitted into the lens tube 54. The lens 51 thus comes into contact with the plastic lens 52.

When a load is applied further to the lens 51, the contact part 53b and the curved surface of the right side of the lens 51 restrict the motion of the plastic lens 52 to cause the plastic lens 52 to move perpendicular to the optical axis 55. As a result, there is obtained a state in which the centers of the lenses 51 and 53 and that of the plastic lens 52 coincide with the optical axis 55. (In this instance, the outer diameter end parts of the lenses 51 and 53 are fitted into the inner diameter end part of the lens tube 54, so that their centers coincide with the optical axis 55.) Then, the adhesive 56 is injected into the space 54b to secure the lens 51 to the lens tube 54 to bring about a state as shown in FIG. 7.

Although the plastic lens 52 and the lens 53 are not fixed directly to the lens tube 54 with any adhesive or the like, these lenses 52 and 53 never deviate from their positions as they are sandwiched in between the lens 51 and the lens tube 54. Further, in a case where the coefficient of linear expansion of the plastic lens 52 greatly differs from that of the lens tube 54, the expansion and contraction of the plastic lens 52 due to heat can be absorbed by the elastic adhesive mentioned above, employed as the adhesive 56. The plastic lens 52 can be prevented from being deformed by heat or the like by the use of the elastic adhesive. Further, since no adhesive is applied to the plastic lens 52, the plastic lens 52 is never deformed by the setting of the adhesive.

In a case where there is not much difference in linear expansion coefficient between the material used for forming the lens tube 54 and the materials used for forming the plastic lens 52 and the lenses 51 and 53, or where the lens tube 54 has a larger elasticity than the lenses 52, 51 and 53, the lenses 51 and 53 and the plastic lens 52 may be fixed by caulking the lens tube 54. Further, the lenses 51 and 53 and the plastic lens 52 may be arranged to be held by a retaining ring or a C ring conventionally used for holding lenses.

In each of the first to fifth embodiments described, at least one of a plurality of lenses to be in marginal contact with each other is arranged to be a plastic lens. This invention is, however, not limited to such arrangement. Any material may be used for the lenses as long as the lens shapes of the embodiments described are obtainable by the use of the material.

Further, in each of the embodiments described, at least one of the lenses is arranged to be a plastic lens for facilitating the manufacture of the lens and also for maximizing the advantageous effect of the invention. The effect of this invention is, however, attainable by using a material having a higher rigidity than a plastic material for the lens. The technological advancement of the recent years has come to permit the manufacture of glass lenses in such shapes as those of each of the embodiments described in a relatively easy manner. The advantageous effect of this invention, therefore, can be attained by replacing the plastic lens with a glass lens.

The lens material of each of the embodiments described is thus not limited to a plastic material and may be selected from among any other materials. Further, of the two curved lens surfaces parts at which the lenses are in marginal contact with each other in each of the embodiments described, one on the side of the plastic lens is formed to have the same curved surface as the other curved lens surface part. This arrangement may be conversely changed to form the curved lens surface part on the other side to have the same curved surface as the curved surface of the one on the side of the plastic lens. Further, in the case of such modification, the lens on the other side may be made of a material such as a glass material instead of a plastic material.

The above-stated curved surface of the lens may be an aspherical surface instead of a spherical surface. Further, the clearance provided perpendicular to the optical axis between the lens which moves perpendicular to the optical axis to have its center coincide with the optical axis and the lens tube holding this lens is arranged to be as follows. The clearance effectively prevents the worst error within a dimensional tolerance limit of the outer diameter of this lens and that of the inner diameter of the lens tube from causing them to interfere with each other and, even if the expansion and contraction of the lens caused by changes in temperature and humidity cause the lens to move perpendicular to the optical axis, with its center coinciding with the optical axis, the outer diameter end part of the lens never comes to hit the inner diameter end part of the lens tube.

As mentioned above, in each of the embodiments described, the contact parts provided in a plurality of lenses for marginal contact are in the form of faces, so that the contacting forces of the plurality of lenses can be dispersed in the direction of the optical axis to prevent any stress from readily concentrating within the lenses. Therefore, unlike the conventional lens tube which has been incapable of adequately holding a lens such as plastic lens in marginal contact, the lenses can be adequately held in marginal contact and the lens centers can be kept in a state of accurately coinciding with the optical axis. Further, the arrangement of positioning a plurality of lenses by utilizing the curved lens surface parts which have the highest degree of precision among other parts of the lenses enables the embodiment to hold the lenses in a state of having their optical axes more accurately coinciding with each other than the conventional method for holding lenses through their marginal contact.

Further, the marginal contact with each other of a lens made of a low rigidity material such as a plastic lens and a lens made of a high rigidity material such as a glass lens prevents a lens fixing force from being readily exerted directly on the plastic lens or the like because the glass lens or the like is inserted after the plastic lens or the like is inserted into the lens tube and then the glass lens or the like is fixed to the lens tube by means of an adhesive, a C ring or a retaining ring, or by caulking the lens tube. The invented method, therefore, effectively prevents the plastic lens or the like from deforming or its curved surface from being distorted to deteriorate the optical performance.

In securing the lens to the lens tube with an adhesive, use of an elastic adhesive of the kind having elasticity during its process of setting absorbs the expansion and contraction of the plastic lens taking place in the direction of the optical axis due to changes in temperature and humidity, so that the plastic lens can be prevented from readily deforming or being distorted. Further, in the case of the marginal contact with each other of two plastic lenses, use of an elastic adhesive which does not much contract during the process of setting in securing the plastic lens to the lens tube effectively prevents the plastic lens from deforming and from being distorted.

Each of the second to fifth embodiments described above has the following advantage. One of the plurality of lenses in marginal contact other than the lens arranged to have its center adjusted to the optical axis by moving it perpendicular to the optical axis and the lens tube which holds this lens are provided with faces which serve to guide relative movement in parallel to the optical axis and also to permit positioning the lens in the direction perpendicular to the optical axis. Therefore, the axes (optical axes) of the plurality of lenses in marginal contact can be caused to coincide with the optical axis of the lens tube without slanting with respect to each other.

Further, in each of the second to fifth embodiments described, the lens having a face extending perpendicular to the optical axis for moving perpendicular to the optical axis and the lens having a curved surface part in a peripheral part on its marginal contact side are moldable by molds. These lenses, therefore, can be easily manufactured. The manufacture becomes very easy particularly in a case where these lenses are plastic lenses. The ease of manufacture in addition to the advantages described above greatly enhances the advantageous effect of this invention.

Figure 8:
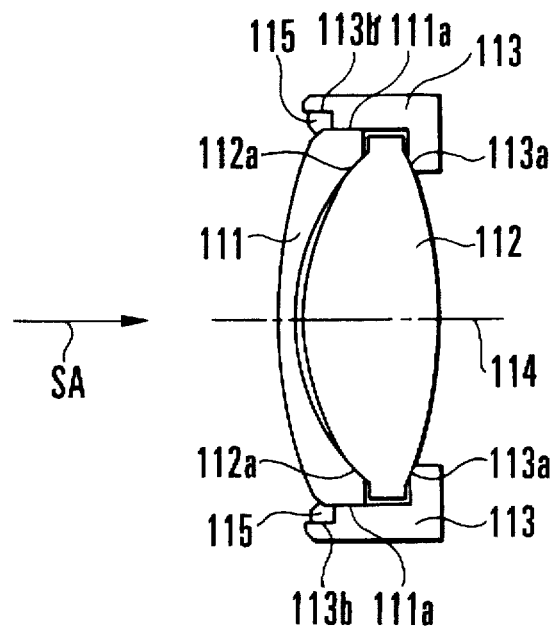
FIG. 8 is a sectional view showing essential parts of a sixth embodiment of this invention.
Figure 9:
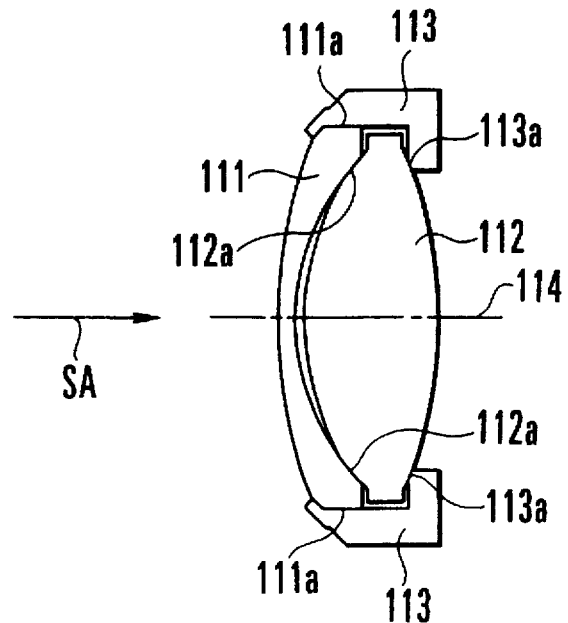
FIG. 9 is a sectional view showing also the essential parts of the sixth embodiment of this invention.

FIGS. 8 and 9 show in sectional views a lens barrel which is arranged as a sixth embodiment of this invention. This lens barrel is adapted for an optical apparatuses such as a video camera, a silver-halide type photographic camera, an interchangeable lens or the like.

Referring to FIGS. 8 and 9, a lens 111 is made of a glass material. A lens 112 is made of a plastic material. In this case, the lens 111 and the plastic lens 112 are in marginal contact with each other (having their peripheral parts in contact with each other while their central parts are not in contact with each other). A lens tube 113 is arranged to hold the lens 111 and the plastic lens 112. The plastic lens 112 has the lens surface of its right side in contact with the lens tube 113 and has a part 112a having the same curved surface (curvature) as the curvature of the curved surface of the lens 111 on the right side (marginal contact side). The plastic lens 112 is in marginal contact with the lens 111 at this part (same curvature area) 112a. The lens 111 has a fitting part 111a arranged along its periphery to be fitted into the lens tube 113 to guide movement in parallel to an optical axis and to permit positioning in a direction perpendicular to the optical axis.

The lens tube 113 has a receiving face 113a which is provided for receiving the plastic lens 112 and has the same curvature (curved surface) as the lens surface of the right side of the plastic lens 112, and a space 113b which is provided for applying an adhesive 115. An optical system composed of the lens 111 and the plastic lens 112 has an optical axis 114. The adhesive 115 is used for securing the lens 111 to the lens tube 113. The plastic lens 112 and the lens tube 113 are in contact with each other in the direction of the optical axis 114 on the right-side lens surface of the plastic lens 112 and the receiving face 113a of the lens tube 113. The diameter of the plastic lens 112 is smaller than the inner diameter of the lens tube 113 to have a clearance left between them in a direction perpendicular to the optical axis 114.

The sixth embodiment is assembled in the following manner. The plastic lens 112 is first inserted from the direction of arrow SA as shown in the drawing into the lens tube 113 to bring the right-side lens surface of the plastic lens 112 into contact with the receiving face 113a of the lens tube 113. The lens 111 is next inserted from the direction of arrow SA into the lens tube 113 to bring the right-side lens surface of the lens 111 into contact with the part 112a of the plastic lens 112. The plastic lens 112 might be deformed if the plastic lens 112 is fitted into or inserted with pressure into the lens tube 113 at its peripheral part. To avoid such deformation, the outer diameter of the plastic lens 112 is arranged to be smaller than the inner diameter of the lens tube 113.

When a load is applied to the lens 111 from the direction of arrow SA with the lens tube 113 fixed, the lens 111 moves to the right, as viewed on the drawing, in parallel to the optical axis 114 almost without slanting at all relative to the optical axis, as the lens 111 is fitted into the lens tube 113, until the lens 111 comes into contact with the plastic lens 112.

With a load applied further to the lens 111, the receiving face 113a and the right-side curved surface of the lens 111 jointly restrict the motion of the plastic lens 112 to cause the plastic lens 112 to move perpendicular to the optical axis 114. As a result, the centers of both the lens 111 and the plastic lens 112 come to coincide with the optical axis 114. After that, the adhesive 115 is injected into the space 113b to secure the lens 111 to the lens tube 113 as shown in FIG. 8. The lens 111 is then fixed in position by caulking the lens tube 113 to bring about a state as shown in FIG. 9.

As shown in FIGS. 8 and 9, the plastic lens 112 is not fixed directly to the lens tube 113 by means of the adhesive 115 or the like. However, the plastic lens 112 never deviates from its position as it is sandwiched in between the lens 111 and the lens tube 113.

In the arrangement as shown in FIG. 8, if the plastic lens 112 and the lens tube 113 greatly differ from each other in linear expansion coefficient or the like, an elastic adhesive of the kind having elasticity in setting is preferably employed as the adhesive 115. The elastic adhesive effectively absorbs the expansion and contraction of the plastic lens 112 due to heat, etc., so that the plastic lens 112 can be prevented from deforming. Further, in the case of FIG. 8, the adhesive 115 is not directly applied to the plastic lens 112, so that the plastic lens 112 can be prevented from being deformed by the contraction of the adhesive 115 taking place at the time of setting of the adhesive 115.

In a case where the linear expansion coefficient of the material with which the lens tube 113 is formed does not much differ from those of the materials with which the plastic lens 112 and the lens 111 are formed, or where the lens tube 113 has a larger elasticity than the plastic lens 112 and the lens 111, the lens 111 and the plastic lens 112 are preferably fixed by caulking the lens tube 113 as shown in FIG. 9. Further, the lens 111 and the plastic lens 112 may be held by a retaining ring or a C ring in a known manner.

In the case of the sixth embodiment, the lens 111 is a negative lens of a meniscus shape having a convex surface on its left side and the plastic lens 112 is a positive lens having convex surfaces on its both sides. However, the shape of the lens 111 may be changed into a positive lens having convex surfaces on both sides and that of the plastic lens 112 into a negative lens of a meniscus shape having a convex surface on the right side as viewed on the drawing, as long as the two lens surfaces which are in marginal contact are a concave lens surface and a convex lens surface.

FIGS. 10 to 20 are sectional views respectively showing essential parts of lens barrels arranged as seventh to seventeenth embodiments of this invention. These lens barrels are adapted for a video camera, a silver-halide type photographic camera, an interchangeable lens or the like. These embodiments are arranged as described below.

Figure 10:
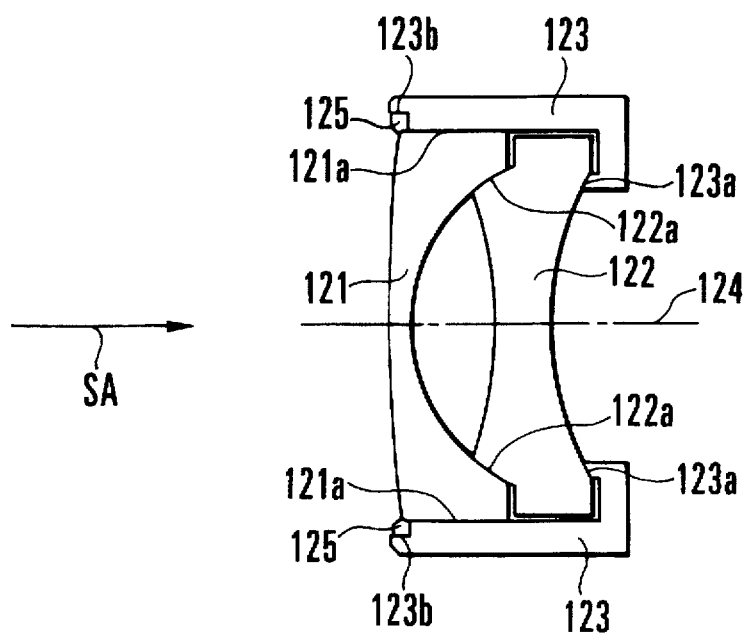
FIG. 10 is a sectional view showing essential parts of a seventh embodiment of this invention.

In the seventh embodiment which is shown in FIG. 10, a lens 121 is made of a glass material. A lens 122 is made of a plastic material. The lens 121 and the plastic lens 122 are in marginal contact with each other. A lens tube 123 is arranged to hold the lens 121 and the plastic lens 122. The plastic lens 122 has a part 122a which has the same curved surface (curvature) as the right-side curved surface of the lens 121 and is in marginal contact with the lens 121 at this part 122a.

The lens 121 has a fitting (engagement) part 121a arranged in its peripheral part to be fitted into the lens tube 123, to guide movement in parallel to the optical axis and to permit positioning in a direction perpendicular to the optical axis. The lens tube 123 has a receiving face 123a which is formed in the same curved surface shape as the curved lens surface of the right side of the plastic lens 122 and is thus arranged to receive the plastic lens 122. The lens tube 123 also has a space 123b which is provided for having an adhesive 125 applied thereto. Reference numeral 124 denotes the optical axis. The adhesive 125 is arranged to secure the lens 121 to the lens tube 123. The plastic lens 122 and the lens tube 123 are in contact with each other in the direction of the optical axis 124 at the lens surface on the right side of the plastic lens 122 and the receiving face 123a of the lens tube 123. The diameter of the plastic lens 122 is smaller than the inner diameter of the lens tube 123 to have a clearance left between them in a direction perpendicular to the optical axis 124.

The seventh embodiment is assembled in the following manner. The plastic lens 122 is first inserted from the direction of arrow SA as shown in FIG. 10 into the lens tube 123 to bring its right-side lens surface into contact with the receiving face 123a of the lens tube 123. The lens 121 is next inserted from the direction of arrow SA to bring the right-side surface of the lens 121 into contact with the part 122a of the plastic lens 122. The plastic lens 122 might be deformed if the plastic lens 122 is fitted or inserted with pressure into the lens tube 123 at its peripheral part. To avoid such deformation, the outer diameter of the plastic lens 122 is arranged to be smaller than the inner diameter of the lens tube 123.

When a load is applied to the lens 121 in the direction of arrow SA with the lens tube 123 fixed, the lens 121 comes into contact with the plastic lens 122 by moving to the right as viewed on the drawing in parallel to the optical axis 124, almost without slanting at all relative to the optical axis 124, as the lens 121 is fitted into the lens tube 123. When a load is applied further to the lens 121, the receiving face 123a and the right-side curved surface of the lens 121 restrict the motion of the plastic lens 122 to cause the plastic lens 122 to move perpendicular to the optical axis 124 in such a way as to bring about a state in which both the center of the lens 121 and that of the plastic lens 122 coincide with the optical axis 124. The lens 121 is then secured to the lens tube 123 by injecting the adhesive 125 into the space 123b. FIG. 10 shows the lens barrel as in a state thus obtained.

Although the plastic lens 122 is not directly fixed to the lens tube 123 by means of the adhesive 125 or the like, the plastic lens 122 never deviates from its position as the plastic lens 122 is sandwiched in between the lens 121 and the lens tube 123. Further, in a case where the plastic lens 122 and the lens tube 123 greatly differ from each other in coefficient of linear expansion or the like, the elastic adhesive mentioned in the foregoing is preferably employed as the adhesive 125. The elastic adhesive 125 then absorbs the expansion and contraction of the plastic lens caused by heat, etc., so that the plastic lens 122 can be prevented from being deformed by heat, etc. Further, since the plastic lens 122 is not directly fixed by the adhesive or the like, the plastic lens 122 can be prevented from being deformed by the contraction of the adhesive 125 taking place while the adhesive 125 is in process of setting.

In a case where the linear expansion coefficient of the material with which the lens tube 123 is formed does not much differ from those of the materials with which the plastic lens 122 and the lens 121 are formed, or where the lens tube 123 has a larger elasticity than the plastic lens 122 and the lens 121, the lens 121 and the plastic lens 122 may be fixed by caulking the lens tube 123 in the same manner as in the case of the sixth embodiment shown in FIG. 9. Further, the lens 121 and the plastic lens 122 may be held by a retaining ring or a C ring in a known manner.

In the case of the seventh embodiment, the lens 121 is a negative lens of a meniscus shape having a convex surface on its left side and the plastic lens 122 is a negative lens having concave surfaces on its both sides. However, the lens 121 and the plastic lens 122 may be in any shapes as long as the two lens surfaces which are in marginal contact are both concave surfaces which are opposed to each other.

Figure 11:
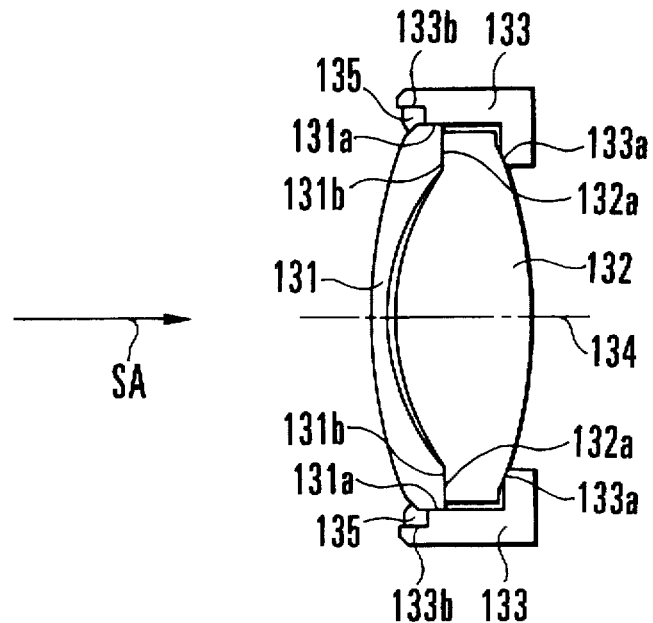
FIG. 11 is a sectional view showing essential parts of an eighth embodiment of this invention.

The eighth embodiment which is shown in FIG. 11 is arranged as follows. A lens 131 and a plastic lens 132 are held by a lens tube 133. Reference numeral 134 denotes an optical axis. Reference numeral 135 denotes an adhesive which is used for securing the lens 131 to the lens tube 133. The plastic lens 132 has a contact part 132a formed in its peripheral part to have a flat face, which is in contact with the lens 131. The lens 131 has a contact part 131b formed in its peripheral part to have a flat face in contact with the plastic lens 132.

The lens 131 also has a fitting part 131a arranged in its peripheral part to be fitted into the lens tube 133, to guide movement in parallel to the optical axis 134 and to perform a positioning action perpendicular to the optical axis 134. The lens tube 133 has a receiving face 133a which receives the plastic lens 132 and has the same curved surface shape as the shape of the lens surface of the right side of the plastic lens 132. The lens tube 133 also has a space 133b which is provided for applying the adhesive 135. The plastic lens 132 is in contact with the lens tube 133 in the direction of the optical axis 134 on the right-side lens surface of the plastic lens 132 and the receiving face 133a of the lens tube 133. The diameter of the plastic lens 132 is smaller than the inner diameter of the lens tube 133 to have a clearance left between them in a direction perpendicular to the optical axis 134.

The eighth embodiment is assembled in the following manner. The plastic lens 132 is first inserted from the direction of arrow SA into the lens tube 133 to bring its right-side lens surface into contact with the receiving face 133a as shown in FIG. 11. The lens 131 is next inserted from the direction of arrow SA to bring its contact part 131b into contact with the contact part 132a of the plastic lens 132.

The plastic lens 132 might be deformed if the peripheral part of the plastic lens 132 is fitted or inserted with pressure into the lens tube 133. To avoid such deformation, the outer diameter of the plastic lens 132 is arranged to be smaller than the inner diameter of the lens tube 133.

The contact part 131b and the contact part 132a have their faces extending perpendicular to the optical axis 134. When a load is applied to the lens 131 in the direction of arrow SA with the lens tube 133 fixed, the lens 131 moves in parallel to the optical axis 134 to the right, as viewed on the drawing, almost without slanting at all relative to the optical axis 134 as the lens 131 is fitted into the lens tube 133. The lens 131 thus comes into contact with the plastic lens 132. When a load is applied further, the receiving face 133a and the contact part 131b of the lens 131 restrict the motion of the plastic lens 132 and cause the plastic lens 132 to move perpendicular to the optical axis 134 in such a way as to bring about a state in which both the center of the lens 131 and that of the plastic lens 132 coincide with the optical axis 134. Then, the adhesive 135 is injected into the space 133b to secure the lens 131 to the lens tube 133 as shown in FIG. 11.

Although the plastic lens 132 is not directly fixed to the lens tube 133 by means of the adhesive 135 or the like, the plastic lens 132 never deviates from its position as the plastic lens 132 is sandwiched in between the lens 131 and the lens tube 133. Further, in a case where the plastic lens 132 and the lens tube 133 greatly differ from each other in coefficient of linear expansion or the like, the elastic adhesive mentioned in the foregoing is preferably employed as the adhesive 135. The elastic adhesive absorbs the expansion and contraction of the plastic lens 132 caused by heat, etc., so that the plastic lens 122 can be prevented from being deformed by heat, etc. Further, since the plastic lens 132 is not directly fixed by the adhesive or the like, the plastic lens 132 can be prevented from being deformed by the contraction of the adhesive 135 taking place while the adhesive 135 is in process of setting.

In a case where the linear expansion coefficient of the material with which the lens tube 133 is formed does not much differ from those of the materials with which the plastic lens 132 and the lens 131 are formed, or where the lens tube 133 has a larger elasticity than the plastic lens 132 and the lens 131, the lens 131 and the plastic lens 132 may be fixed by caulking the lens tube 133 in the same manner as in the case of the sixth embodiment shown in FIG. 9. Further, the plastic lens 132 and the lens 131 may be arranged to be held by a retaining ring or a C ring in a known manner.

Further, in this embodiment, the lens 131 and the plastic lens 132 do not have to be in the shapes described. They may be arranged in any shapes as long as they have the contact parts 131b and 132a arranged to extend perpendicular to the optical axis 134.

Figure 12:
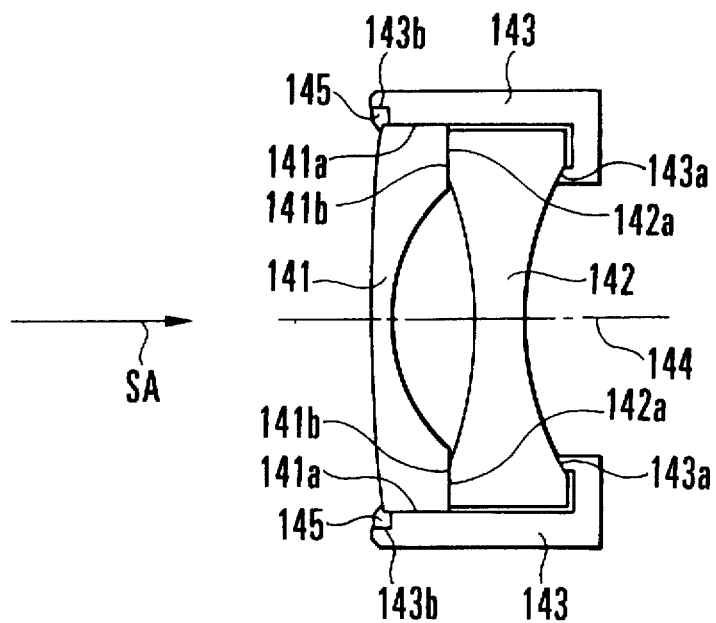
FIG. 12 is a sectional view showing essential parts of a ninth embodiment of this invention.

The ninth embodiment which is shown in FIG. 12 has a lens 141 made of a glass material, a plastic lens 142 made of a plastic material and a lens tube 143 arranged to hold the lens 141 and the plastic lens 142. The plastic lens 142 has a contact part 142a for contact with the lens 141 while the lens 141 has a contact part 141b for contact with the plastic lens 142.

The lens 141 has a fitting part 141a which is arranged in its peripheral part to be fitted into the lens tube 143, to guide movement in parallel to an optical axis 144 and to perform positioning action perpendicular to the optical axis 144. The lens tube 143 has a receiving face 143a which receives the plastic lens 142 and has the same curved surface shape as the shape of the lens surface of the right side of the plastic lens 142. The lens tube 143 also has a space 143b which is provided for applying an adhesive 145 which is used for securing the lens 141 to the lens tube 143. The plastic lens 142 is in contact with the lens tube 143 in the direction of the optical axis 144 on the right-side lens surface of the plastic lens 142 and the receiving face 143a of the lens tube 143. The diameter of the plastic lens 142 is smaller than the inner diameter of the lens tube 143 to have a clearance left between them in a direction perpendicular to the optical axis 144.

The ninth embodiment is assembled in the following manner. The plastic lens 142 is first inserted from the direction of arrow SA into the lens tube 143 to bring its right-side lens surface into contact with the receiving face 143a as shown in FIG. 12. The lens 141 is next inserted from the direction of arrow SA to bring its contact part 141b into contact with the contact part 142a of the plastic lens 142. The plastic lens 142 might be deformed if the peripheral part of the plastic lens 142 is fitted or inserted with pressure into the lens tube 143. To avoid such deformation, the outer diameter of the plastic lens 142 is arranged to be smaller than the inner diameter of the lens tube 143. The faces of the contact parts 141b and 142a extend perpendicular to the optical axis 144.

When a load is applied to the lens 141 in the direction of arrow SA with the lens tube 143 fixed, the lens 141 moves in parallel to the optical axis 144 to the right, as viewed on the drawing, almost without slanting at all relative to the optical axis 144 as the lens 141 is fitted into the lens tube 143. The lens 141 thus comes into contact with the plastic lens 142. When a load is applied further to the lens 141, the receiving face 143a and the contact part 141b of the lens 141 restrict the motion of the plastic lens 142 and cause the plastic lens 142 to move perpendicular to the optical axis 144 in such a way as to bring about a state in which both the center of the lens 141 and that of the plastic lens 142 coincide with the optical axis 144. Then, the adhesive 145 is injected into the space 143b to secure the lens 141 to the lens tube 143 as shown in FIG. 12.

Although the plastic lens 142 is not directly fixed to the lens tube 143 by means of the adhesive 145 or the like, the plastic lens 142 never deviates from its position as the plastic lens 142 is sandwiched in between the lens 141 and the lens tube 143. Further, in a case where the plastic lens 142 and the lens tube 143 greatly differ from each other in coefficient of linear expansion or the like, the elastic adhesive mentioned above is preferably employed as the adhesive 145. The elastic adhesive absorbs the expansion and contraction of the plastic lens 142 caused by heat, etc., so that the plastic lens 142 can be prevented from being deformed by heat, etc. Further, since the plastic lens 142 is not directly fixed by the adhesive 145 or the like, the plastic lens 142 can be prevented from being deformed by the contraction of the adhesive 145 taking place while the adhesive 145 is in process of setting.

In a case where the linear expansion coefficient of the material with which the lens tube 143 is formed does not much differ from those of the materials with which the plastic lens 142 and the lens 141 are formed, or where the lens tube 143 has a larger elasticity than the plastic lens 142 and the lens 141, the lens 141 and the plastic lens 142 may be fixed by caulking the lens tube 143 in the same manner as in the case of the sixth embodiment shown in FIG. 9. Further, the plastic lens 142 and the lens 141 may be arranged to be held by a retaining ring or a C ring in a known manner.

In the case of the ninth embodiment, the lens 141 is a negative lens of a meniscus shape having a convex surface on its left side and the plastic lens 142 is a negative lens having concave surfaces on its both sides. However, the lens 141 and the plastic lens 142 may be in any shapes as long as the contact parts 141b and 142a are in the shape of having their faces extending perpendicular to the optical axis 144.

Figure 13:
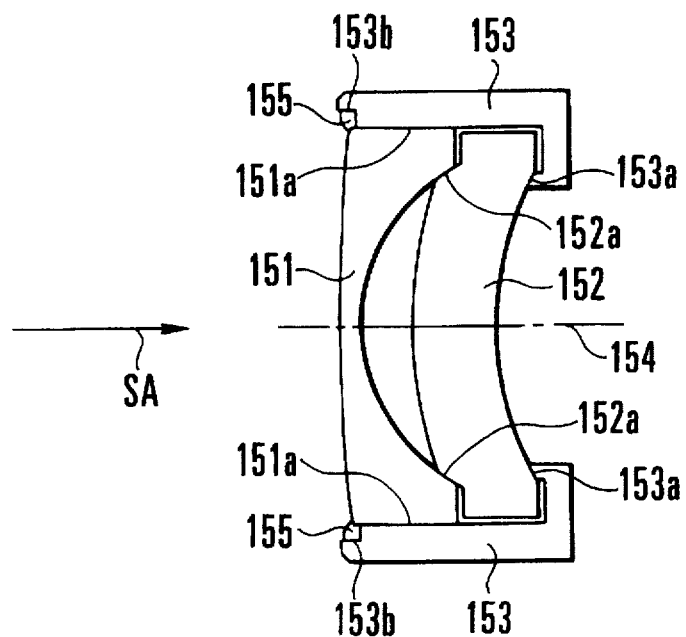
FIG. 13 is a sectional view showing essential parts of a tenth embodiment of this invention.

The tenth embodiment which is shown in FIG. 13 includes a lens 151 which is made of a glass material and a lens 152 which is made of a plastic material. The lenses 151 and 152 are in marginal contact with each other. A lens tube 153 is arranged to hold the lens 151 and the plastic lens 152. The plastic lens 152 has a part 152a which has the same curved surface (curvature) as the curved surface (curvature) of the right side of the lens 151. The lens 151 and the plastic lens 152 are in marginal contact at this part 152a.

The lens 151 has a fitting part 151a arranged in its peripheral part to be fitted into the lens tube 153, to guide movement in parallel to an optical axis 154 and to perform a positioning action perpendicular to the optical axis 154. The lens tube 153 has a receiving face 153a which is arranged to receive the plastic lens 152 and has the same curved surface as the curved surface of the right side of the plastic lens 152. The lens tube 153 is provided with a space 153b for having an adhesive 155 applied thereto. The adhesive 155 is used for securing the lens 151 to the lens tube 153. The plastic lens 152 is arranged to be in contact with the lens tube 153 in the direction of the optical axis 154 on its right-side lens surface at the receiving face 153a of the lens tube 153. The diameter of the plastic lens 152 is smaller than the inner diameter of the lens tube 153 to have a clearance left between them in a direction perpendicular to the optical axis 154.

The tenth embodiment is assembled in the following manner. The plastic lens 152 is first inserted from the direction of arrow SA into the lens tube 153 to bring its right-side lens surface into contact with the receiving face 153a as shown in FIG. 13. The lens 151 is next inserted from the direction of arrow SA to bring its right-side surface into contact with the part 152a of the plastic lens 152. The plastic lens 152 might be deformed if the peripheral part of the plastic lens 152 is fitted or inserted with pressure into the lens tube 153. To avoid such deformation, the outer diameter of the plastic lens 152 is arranged to be smaller than the inner diameter of the lens tube 153.

When a load is applied to the lens 151 in the direction of arrow SA with the lens tube 153 fixed, the lens 151 moves in parallel to the optical axis 154 to the right, as viewed on the drawing, almost without slanting at all relative to the optical axis 154 as the lens 151 is fitted into the lens tube 153. The lens 151 thus comes into contact with the plastic lens 152. When a load is applied further to the lens 151, the receiving face 153a and the right-side curved surface of the lens 151 then restrict the motion of the plastic lens 152 and cause the plastic lens 152 to move perpendicular to the optical axis 154 in such a way as to bring about a state in which both the center of the lens 151 and that of the plastic lens 152 coincide with the optical axis 154. Then, the adhesive 155 is injected into the space 153b to secure the lens 151 to the lens tube 153 as shown in FIG. 13.

Although the plastic lens 152 is not directly fixed to the lens tube 153 by means of the adhesive 155 or the like, the plastic lens 152 never deviates from its position as the plastic lens 152 is sandwiched in between the lens 151 and the lens tube 153. Further, in a case where the plastic lens 152 and the lens tube 153 greatly differ from each other in coefficient of linear expansion or the like, the elastic adhesive is preferably employed as the adhesive 155 as mentioned in the foregoing. The elastic adhesive absorbs the expansion and contraction of the plastic lens 152 caused by heat, etc., so that the plastic lens 152 can be prevented from being deformed by heat, etc. Further, since the plastic lens 152 is not directly fixed by the adhesive 155 or the like, the plastic lens 152 can be prevented from being deformed by the contraction of the adhesive 155 taking place while the adhesive 155 is in process of setting.

In a case where the linear expansion coefficient of the material with which the lens tube 153 is formed does not much differ from those of the materials with which the plastic lens 152 and the lens 151 are formed, or where the lens tube 153 has a larger elasticity than the plastic lens 152 and the lens 151, the lens 151 and the plastic lens 152 may be fixed by caulking the lens tube 153 in the same manner as in the case of the sixth embodiment shown in FIG. 9. Further, the plastic lens 152 and the lens 151 may be arranged to be held by a retaining ring or a C ring in a known manner.

In the case of the tenth embodiment, the lens 151 and the plastic lens 152 are in meniscus shapes, both having their convex surface on the left side. However the lens 151 and the plastic lens 152 may be in any other shapes as long as their lens surfaces which are in marginal contact are facing in the same direction.

Figure 14:
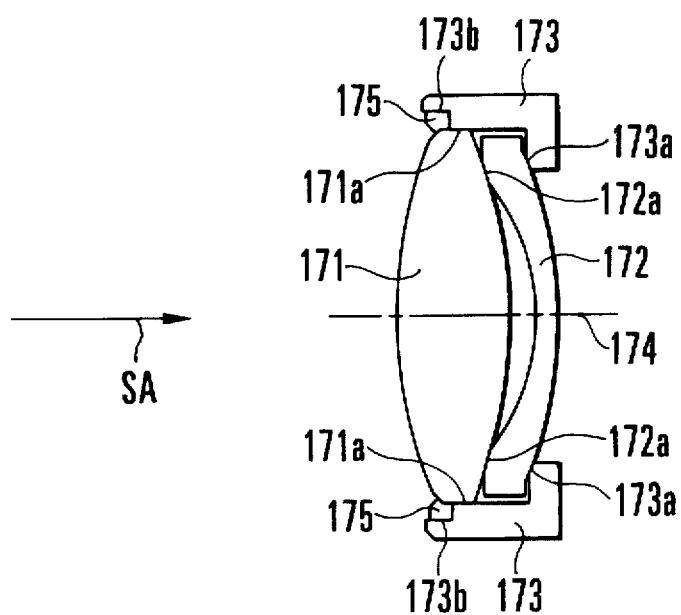
FIG. 14 is a sectional view showing essential parts of an eleventh embodiment of this invention.

The eleventh embodiment which is shown in FIG. 14 differs from the tenth embodiment shown in FIG. 13 in that the lens 151 of the tenth embodiment is replaced with a lens 171 which has convex surfaces on both sides while the plastic lens 152 is replaced with a plastic lens 172 of a meniscus shape having a convex surface on its right side and that the lens 171 and the plastic lens 172 are in marginal contact at a part 172a of the plastic lens 172. With the exception of these points, the basic arrangement of the eleventh embodiment is the same as that of the tenth embodiment.

In the eleventh embodiment shown in FIG. 14, the lens 171 is made of a glass material. The plastic lens 172 is made of a plastic material. These lenses 171 and 172 are in marginal contact with each other and are held by a lens tube 173. The plastic lens 172 has the part 172a at which the lenses 171 and 172 are in marginal contact with each other. The part 172a has a curved surface at the same curvature as the curvature of the curved surface of the right side of the lens 171.

The lens 171 has a fitting part 171a arranged in its peripheral part to be fitted into the lens tube 173, to guide movement in parallel to an optical axis 174 and to perform a positioning action perpendicular to the optical axis 174. The lens tube 173 is provided with a receiving face 173a for receiving the plastic lens 172. The receiving face 173a is curved at the same curvature as the curved surface of the right side of the plastic lens 172. The lens tube 173 is provided also with a space 173b for having an adhesive 175 applied thereto to secure the lens 171 to the lens tube 173. The plastic lens 172 is in contact with the receiving face 173a of the lens tube 173 on its right-side lens surface in the direction of the optical axis 174, leaving a clearance between the plastic lens 172 and lens tube 173 in a direction perpendicular to the optical axis 174.

The eleventh embodiment is assembled basically in the same manner as the tenth embodiment.

Figure 15:
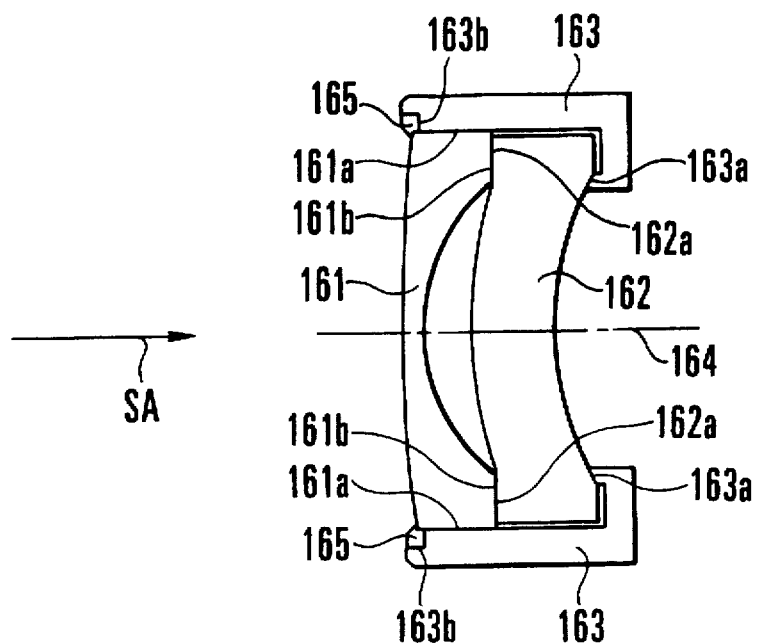
FIG. 15 is a sectional view showing essential parts of a twelfth embodiment of this invention.

The twelfth embodiment which is shown in FIG. 15 includes a lens 161 which is made of a glass material and a lens 162 which is made of a plastic material. A lens tube 163 is arranged to hold the lens 161 and the plastic lens 162. The plastic lens 162 has a contact part 162a for contact with the lens 161. The lens 161 has a contact part 161b for contact with the lens 162.

The lens 161 also has a fitting part 161a which is arranged in its peripheral part to be fitted into the lens tube 163, to guide movement in parallel to an optical axis 164 and to perform a positioning action perpendicular to the optical axis 164. The lens tube 163 is provided with a receiving face 163a for receiving the plastic lens 162. The receiving face 163a is curved at the same curvature as the curved surface of the right side of the plastic lens 162. The lens tube 163 is provided also with a space 163b for having an adhesive 165 applied thereto to secure the lens 161 to the lens tube 163. The plastic lens 162 is in contact with the receiving face 163a of the lens tube 163 on its right-side lens surface in the direction of the optical axis 164, leaving a clearance between the plastic lens 162 and lens tube 163 in a direction perpendicular to the optical axis 164, as the diameter of the lens 162 is smaller than the inner diameter of the lens tube 163.

The twelfth embodiment is assembled in the following manner. The plastic lens 162 is first inserted from the direction of arrow SA into the lens tube 163 to bring its right-side lens surface into contact with the receiving face 163a as shown in FIG. 15. The lens 161 is next inserted from the direction of arrow SA to bring its right-side surface into contact with the contact part 162a of the plastic lens 162. The plastic lens 162 might be deformed if the peripheral part of the plastic lens 162 is fitted or inserted with pressure into the lens tube 163. To avoid such deformation, the outer diameter of the plastic lens 162 is arranged to be smaller than the inner diameter of the lens tube 163. Further, the contact parts 161b and 162a are arranged to extend perpendicular to the optical axis 164.

When a load is applied to the lens 161 in the direction of arrow SA with the lens tube 163 fixed, the lens 161 moves in parallel to the optical axis 164 to the right, as viewed on the drawing, almost without slanting at all relative to the optical axis 164 as the lens 161 is fitted into the lens tube 163. The lens 161 thus comes into contact with the plastic lens 162. When a load is applied further to the lens 161, the receiving face 163a and the contact part 161b of the lens 161 then restrict the motion of the plastic lens 162 and cause the plastic lens 162 to move perpendicular to the optical axis 164 in such a way as to bring about a state in which both the center of the lens 161 and that of the plastic lens 162 coincide with the optical axis 164. Then, the adhesive 165 is injected into the space 163b to secure the lens 161 to the lens tube 163 as shown in FIG. 15.

Although the plastic lens 162 is not directly fixed to the lens tube 163 by means of the adhesive 165 or the like, the plastic lens 162 never deviates from its position as the plastic lens 162 is sandwiched in between the lens 161 and the lens tube 163. Further, in a case where the plastic lens 162 and the lens tube 163 greatly differ from each other in coefficient of linear expansion or the like, an elastic adhesive is preferably employed as the adhesive 165. The elastic adhesive absorbs the expansion and contraction of the plastic lens 162 caused by heat, etc., so that the plastic lens 162 can be prevented from being deformed by heat, etc. Further, since the plastic lens 162 is not directly fixed by the adhesive 165 or the like, the plastic lens 162 can be prevented from being deformed by the contraction of the adhesive 165 taking place while the adhesive 165 is in process of setting.

In a case where the linear expansion coefficient of the material with which the lens tube 163 is formed does not much differ from those of the materials with which the plastic lens 162 and the lens 161 are formed, or where the lens tube 163 has a larger elasticity than the plastic lens 162 and the lens 161, the lens 161 and the plastic lens 162 may be fixed by caulking the lens tube 163 in the same manner as in the case of the sixth embodiment shown in FIG. 9. Further, the plastic lens 162 and the lens 161 may be arranged to be held by a retaining ring or a C ring in a known manner.

In the case of the twelfth embodiment, the lens 161 and the plastic lens 162 are in meniscus shapes, both having their convex surface on the left side. However the lens 161 and the plastic lens 162 may be in any other shapes as long as the faces of the contact parts 161b and 162a are extending perpendicular to the optical axis 164.

Figure 16:
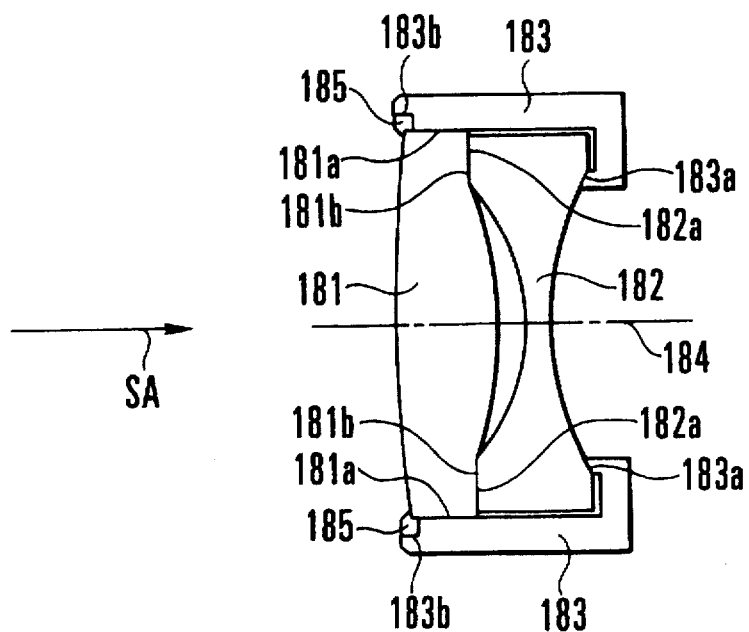
FIG. 16 is a sectional view showing essential parts of a thirteenth embodiment of this invention.

The thirteenth embodiment which is shown in FIG. 16 differs from the twelfth embodiment of FIG. 15 in the following points. In this case, the lens 161 is replaced with a lens 181 which has convex surfaces on its both sides and the lens 162 is replaced with a lens 182 which has concave surfaces on its both sides.

Referring to FIG. 16, the thirteenth embodiment includes the lens 181, which is made of a glass material, and the lens 182, which is made of a plastic material. A lens tube 183 holds the lens 181 and the plastic lens 182. The plastic lens 182 has a contact part 182a for contact with the lens 181. The lens 181 has a contact part 181b for contact with the plastic lens 182.

The lens 181 also has a fitting part 181a which is arranged in the peripheral part of the lens 181 to be fitted into the lens tube 183, to guide movement in parallel to an optical axis 184 and to perform a positioning action perpendicular to the optical axis 184. The lens tube 183 is provided with a receiving face 183a for receiving the plastic lens 182. The receiving face 183a is curved at the same curvature as the curved surface of the right side of the plastic lens 182. The lens tube 183 is provided also with a space 183b for having an adhesive 185 applied thereto to secure the lens 181 to the lens tube 183. The plastic lens 182 is in contact with the receiving face 183a of the lens tube 183 on its right-side lens surface in the direction of the optical axis 184, leaving a clearance between the plastic lens 182 and lens tube 183 in a direction perpendicular to the optical axis 184, as the diameter of the lens 182 is smaller than the inner diameter of the lens tube 183.

The thirteenth embodiment is assembled basically in the same manner as the twelfth embodiment of FIG. 15.

Figure 17:
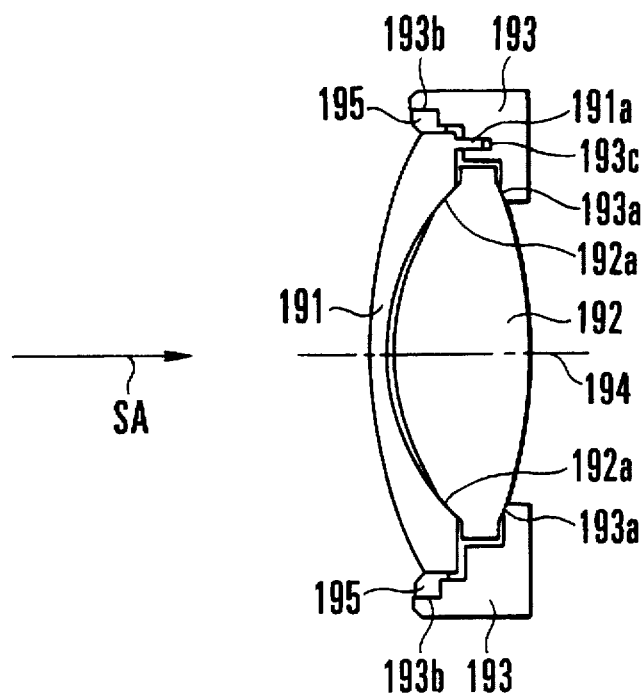
FIG. 17 is a sectional view showing essential parts of a fourteenth embodiment of this invention.

The fourteenth embodiment which is shown in FIG. 17 is next described as follows:

Referring to FIG. 17, the fourteenth embodiment includes two plastic lenses 191 and 192. A lens tube 193 is arranged to hold the plastic lenses 191 and 192 and has an optical axis 194. An adhesive 195 is used for securing the plastic lens 191 to the lens tube 193. The plastic lens 191 has at least one dowel 191a which is formed to extend in parallel to the optical axis 194. The dowel 191a is fitted into a hole part 193c which is formed in the lens tube 193 to extend in parallel to the optical axis 194. In this case, the positional relation between the lens tube 193 and the plastic lens 191 is determined by the dowel 191a and the hole part 193c.

The plastic lens 192 has a part 192a the surface of which is curved at the same curvature as the right-side curved surface of the plastic lens 191. The plastic lenses 191 and 192 are in marginal contact at this part 192a. The lens tube 193 has a receiving face 193a which is curved in the same curvature as the right-side lens surface of the plastic lens 192 and is arranged to allow the plastic lens 192 to be in contact with the lens tube 193 on its right-side curved surface and this receiving face 193a. The lens tube 193 is provided with a space 193b for the adhesive 195, which is injected into the space 193b to secure the plastic lens 191 to the lens tube 193. The plastic lens 192 is arranged to be in contact with the lens tube 193 on its right-side lens surface and the receiving face 193a of the lens tube 193 in the direction of the optical axis 194. Since the diameter of the plastic lens 192 is arranged to be smaller than the inner diameter of the lens tube 193, when the plastic lens 192 is in contact with the lens tube 193, there is left a clearance between them in a direction perpendicular to the optical axis 194. Meanwhile, the plastic lens 191 is in fitted engagement with the lens tube 193 only at the dowel 191a.

In the case of the fourteenth embodiment, the glass lens 111 of the sixth embodiment is replaced with the plastic lens 191. The sixth embodiment is arranged to have the position of the lens 111 relative to the lens tube 113 in the direction perpendicular to the optical axis determined by fitting the peripheral part of the lens 111 into the lens tube 113. In the case of the fourteenth embodiment, on the other hand, the plastic lens 191 is positioned by means of the dowel 191a of the lens 191 and the hole part 193c of the lens tube 193.

The fourteenth embodiment is assembled in the following manner. The plastic lens 192 is first inserted from the direction of arrow SA as shown in the drawing into the lens tube 193 to bring the right-side lens surface of the plastic lens 192 into contact with the receiving face 193a of the lens tube 193. The plastic lens 191 is next inserted from the direction of arrow SA into the lens tube 193 to fit the dowel 191a into the hole part 193c and also to bring the right-side lens surface of the plastic lens 191 into contact with the part 192a of the plastic lens 192. The plastic lenses 191 and 192 might be deformed if the plastic lenses 191 and 192 are fitted or inserted with pressure into the lens tube 193 at their peripheral parts. To avoid such deformation, the outer diameters of the plastic lenses 191 and 192 are arranged to be smaller than the inner diameters of corresponding parts of the lens tube 193.

When a load is applied to the plastic lens 191 from the direction of arrow SA with the lens tube 193 fixed, the plastic lens 191 moves to the right, as viewed on the drawing, in parallel to the optical axis 194, almost without slanting at all relative to the optical axis 194 as the dowel 191a of the lens 191 is fitted into hole part 193c of the lens tube 193, until the plastic lens 191 comes into contact with the plastic lens 192. With a load applied further to the plastic lens 191, the receiving face 193a and the right-side curved surface of the plastic lens 191 restrict the motion of the plastic lens 192 to cause the plastic lens 192 to move perpendicular to the optical axis 194. As a result, the centers of both the plastic lenses 191 and 192 come to coincide with the optical axis 194. After that, the adhesive 195 is injected into the space 193b to secure the plastic lens 191 to the lens tube 193 as shown in FIG. 17.

Further, since the plastic lenses 191 and 192 are in contact with each other at their peripheral parts, the adhesive 195 never flows in between these lenses. The plastic lens 192 is not fixed directly to the lens tube 193 by an adhesive or the like. The plastic lens 192, however, never deviates from its position as it is sandwiched in between the lens 191 and the lens tube 193. Further, if the plastic lenses 191 and 192 and the lens tube 193 greatly differ from each other in coefficient of linear expansion or the like, an elastic adhesive of the kind mentioned in the foregoing is preferably employed as the adhesive 195. The elastic adhesive effectively absorbs the expansion and contraction of the plastic lenses 191 and 192 due to heat, etc., so that the plastic lenses 191 and 192 can be prevented from deforming. Further, to prevent the plastic lens 191 from being deformed by heat or the like when the adhesive 195 is applied, it is preferable to use an adhesive which does not much contract when it is in process of setting.

In this case, the plastic lens 192 has the part 192a arranged to have the same curved surface as the right-side curved surface of the plastic lens 191. This arrangement, however, may be changed to arrange the right-side curved surface of the plastic lens 191 to include a part formed in its peripheral part to have the same curvature as the left-side curved surface of the plastic lens 192. It is possible to provide, both in the peripheral part on the right side of the plastic lens 191 and in the peripheral part on the left side of the plastic lens 192, such curved surface parts that have the same curvature but differ from the curvatures of the right-side curved surface of the plastic lens 191 and the left-side curved surface of the plastic lens 192. It is also possible to arrange these parts to have, instead of the curved surfaces, tapered or slanting surfaces not orthogonally intersecting the optical axis 194.

Further, in the fourteenth embodiment, the plastic lens 192 may be replaced with a lens made of a glass material or the like having a relatively high rigidity. Further, in this case, even if the glass or plastic lens 192 happens to be stuck to the lens tube 193 or the plastic lens 191 by the intrusion of the adhesive 195 through some clearance between the lens tube 193 and the plastic lens 191, such intrusion of the adhesive brings about no problem.

Figure 18:
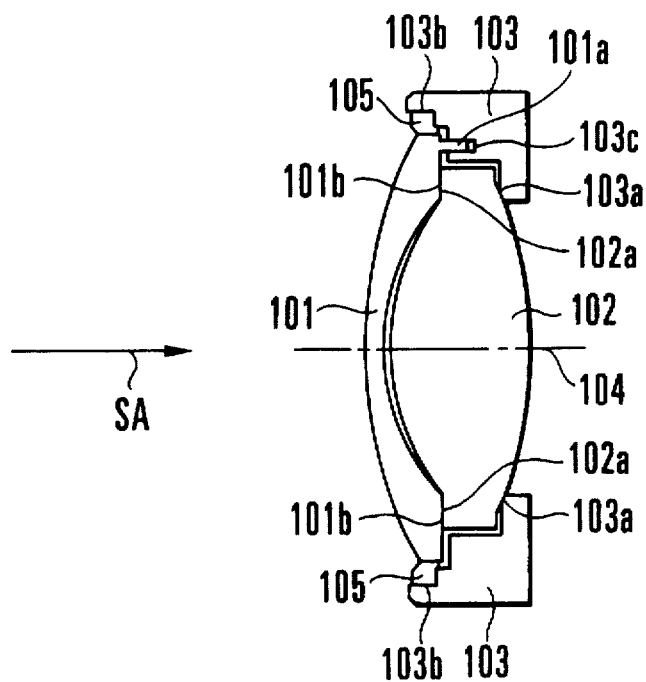
FIG. 18 is a sectional view showing essential parts of a fifteenth embodiment of this invention.

The fifteenth embodiment which is shown in FIG. 18 is arranged as follows:

Referring to FIG. 18, the fifteenth embodiment includes two plastic lenses 101 and 102. A lens tube 103 is arranged to hold the plastic lenses 101 and 102 and has an optical axis 104. An adhesive 105 is used for securing the plastic lens 101 to the lens tube 103. The plastic lens 101 has at least one dowel 101a which is formed to extend in parallel to the optical axis 104. The dowel 101a is fitted into a hole part 103c which is formed in the lens tube 103 to extend in parallel to the optical axis 104. In this case, the positional relation between the lens tube 103 and the plastic lens 101 is determined by the dowel 101a and the hole part 103c.

The plastic lenses 101 and 102 respectively have contact parts 101b and 102a which extend perpendicular to the optical axis 104. The plastic lenses 101 and 102 are in contact with each other at these contact parts 101b and 102a. The lens tube 103 has a receiving face 103a which is curved in the same curvature as the right-side lens surface of the plastic lens 102 and is arranged to allow the plastic lens 102 to be in contact with the lens tube 103 on its right-side curved surface and this receiving face 103a. The lens tube 103 is provided with a space 103b for the adhesive 105, which is injected into the space 103b to secure the plastic lens 101 to the lens tube 103. The plastic lens 102 is arranged to be in contact with the lens tube 103 on its right-side lens surface and the receiving face 103a of the lens tube 103 in the direction of the optical axis 104. Since the diameter of the plastic lens 102 is arranged to be smaller than the inner diameter of the lens tube 103, when the plastic lens 102 is in contact with the lens tube 103, there is left a clearance between them in a direction perpendicular to the optical axis 104. Meanwhile, the plastic lens 101 is in fitted engagement with the lens tube 103 only at the dowel 101a.

In the case of the fifteenth embodiment, the glass lens 131 of the eighth embodiment of FIG. 11 is replaced with the plastic lens 101. The eighth embodiment is arranged to have the position of the lens relative to the lens tube in the direction perpendicular to the optical axis is determined by fitting the peripheral part of the lens into the inner circumferential part of the lens tube. In the case of the fifteenth embodiment, on the other hand, the plastic lens 101 is positioned by means of the dowel 101a of the plastic lens 101 and the hole part 103c of the lens tube 103.

The fifteenth embodiment is assembled in the following manner. The plastic lens 102 is first inserted from the direction of arrow SA as shown in the drawing into the lens tube 103 to bring the right-side lens surface of the plastic lens 102 into contact with the receiving face 103a of the lens tube 103. The plastic lens 101 is next inserted from the direction of arrow SA into the lens tube 103 to fit the dowel 101a into the hole part 103c and also to bring the right-side lens surface of the plastic lens 101 into contact with the contact part 102a of the plastic lens 102. The plastic lenses 101 and 102 might be deformed if the plastic lenses 101 and 102 are fitted or inserted with pressure into the lens tube 103 at their peripheral parts. To avoid such deformation, the outer diameters of the plastic lenses 101 and 102 are arranged to be smaller than the inner diameters of corresponding parts of the lens tube 103. Further, the contact parts 101b and 102a are faces extending perpendicular to the optical axis 104.

When a load is applied to the plastic lens 101 from the direction of arrow SA with the lens tube 103 fixed, the plastic lens 101 moves to the right, as viewed on the drawing, in parallel to the optical axis 104 almost without slanting at all relative to the optical axis 104 as the dowel 101a which extends in parallel to the optical axis is fitted into the hole part 103c, until the plastic lens 101 comes into contact with the plastic lens 102. With a load applied further to the plastic lens 101, the receiving face 103a and the contact part 101b of the plastic lens 101 restrict the motion of the plastic lens 102 to cause the plastic lens 102 to move perpendicular to the optical axis 104. As a result, the centers of both the plastic lenses 101 and 102 come to coincide with the optical axis 104. After that, the adhesive 105 is injected into the space 103b to secure the plastic lens 101 to the lens tube 103 as shown in FIG. 18.

Further, since the plastic lenses 101 and 102 are in contact with each other at their peripheral parts, the adhesive 105 never flows in between these lenses. The plastic lens 102 is not fixed directly to the lens tube 103 by an adhesive or the like. The plastic lens 102, however, never deviates from its position as it is sandwiched in between the lens 101 and the lens tube 103. Further, if the plastic lenses 101 and 102 and the lens tube 103 greatly differ from each other in coefficient of linear expansion or the like, an elastic adhesive of the kind mentioned in the foregoing is preferably employed as the adhesive 105. The elastic adhesive effectively absorbs the expansion and contraction of the plastic lenses 101 and 102 due to heat, etc., so that the plastic lenses 101 and 102 can be prevented from deforming. Further, to prevent the plastic lens 101 from being deformed by heat or the like when the adhesive 105 is applied, it is preferable to use an adhesive which does not much contract when it is in process of setting.

In the fifteenth embodiment, the plastic lenses 101 and 102 may be in any shapes as long as both of these lenses are provided with the contact parts 101b and 102a. The plastic lens 102 may be replaced with a lens which is made of a material having a relatively high rigidity such as a glass material. In this case, even if the glass or plastic lens 102 happens to be stuck to the lens tube 103 or the plastic lens 101 by the intrusion of the adhesive 105 through some clearance between the lens tube 103 and the plastic lens 101, such intrusion of the adhesive brings about no problem.

Figure 19:
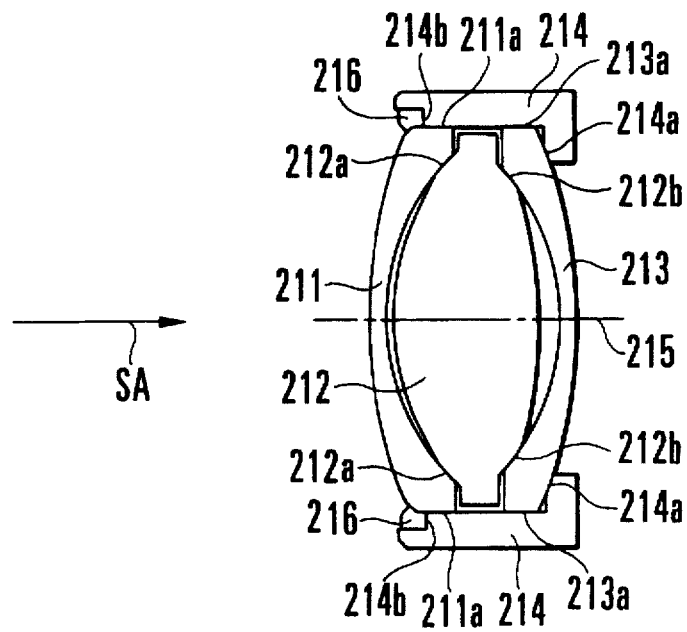
FIG. 19 is a sectional view showing essential parts of a sixteenth embodiment of this invention.

The sixteenth embodiment which is shown in FIG. 19 is described as follows:

Referring to FIG. 19, lenses 211 and 213 each are made of a glass material. A lens 212 is made of a plastic material. A lens tube 214 holds the lenses 211 and 213 and the plastic lens 212 and has an optical axis 215. Reference numeral 216 denotes an adhesive. The plastic lens 212 has a part 212a which has a curved surface at the same curvature as the curved surface of the right-side curved lenses surface of the lens 211 and a part 212b which has a curved surface at the same curvature as the left-side curved lens surface of the lens 213. The lens 212 is in marginal contact with the plastic lens 211 and 213 at these parts 212a and 212b.

The lens tube 214 has a receiving face 214a which is curved at the same curvature as the right-side curved lens surface of the lens 213 and which is in contact with the right-side curved lens surface of the lens 213.

The lenses 211 and 213 are respectively provided with fitting parts 211a and 213a in their peripheral parts for fitting into the lens tube 214. The lens tube 214 has the receiving face 214a for the lens 213 and also has a space 214b for the adhesive 216. The plastic lens 212 is in contact with the lenses 211 and 213 at the parts 212a and 212b in the direction of the optical axis 215. The diameter of the plastic lens 212 is smaller than the inner diameter of the lens tube 214 to have a clearance left between the lens tube 214 and the plastic lens 212 in a direction perpendicular to the optical axis 215.

The sixteenth embodiment is assembled in the following manner. The lens 213 is first inserted into the lens tube 214 from the direction of arrow SA in such a way as to bring the lens surface on its right side into contact with the receiving surface 214a of the lens tube 214. The plastic lens 212 is next inserted from the direction of arrow SA to bring the part 212b into contact with the lens 213. Subsequently, the lens 211 is inserted from the direction of arrow SA to bring the right-side surface of the lens 211 into contact with the part 212a of the plastic lens 212.

The plastic lens 212 might be deformed if the peripheral part of the plastic lens 212 is fitted or inserted with pressure into the lens tube 214. To avoid such deformation, the outer diameter of the plastic lens 212 is arranged to be smaller than the inner diameter of the lens tube 214. When a load is applied to the lens 211 in the direction of arrow SA with the lens tube 214 fixed, the lens 211 moves to the right as viewed on the drawing in parallel to the optical axis 215 almost without slanting at all relative to the optical axis 215 as the lens 211 is fitted into the lens tube 214. The lens 211 thus comes into contact with the plastic lens 212.

When a load is applied further to the lens 211, the right-side curved surface of the lens 211 and the left-side curved surface of the plastic lens 213 restrict the movement of the plastic lens 212 to cause the plastic lens 212 to move perpendicular to the optical axis 215. As a result, there is obtained a state in which the centers of the lenses 211 and 213 and that of the plastic lens 212 coincide with the optical axis 215. (In this instance, the outer diameter end parts of the lenses 211 and 213 are fitted into the inner diameter end part of the lens tube 214, so that their centers coincide with the optical axis 215.) Then, the adhesive 216 is injected into the space 214b to secure the lens 211 to the lens tube 214 to bring about a state as shown in FIG. 19.

Although the plastic lens 212 and the lens 213 are not fixed directly to the lens tube 214 with any adhesive or the like, these lenses 212 and 213 never deviate from their positions as they are sandwiched in between the lens 211 and the lens tube 214. Further, in a case where the coefficient of linear expansion of the plastic lens 212 greatly differs from that of the lens tube 214, the expansion and contraction of the plastic lens 212 due to heat or the like can be absorbed by the elastic adhesive mentioned above, employed as the adhesive 216, as mentioned in the foregoing. The plastic lens 212 thus can be prevented from being deformed by heat or the like by the use of the elastic adhesive. Since no adhesive is applied directly to the plastic lens 212, the plastic lens 212 is not easily deformed by the setting of an adhesive.

In a case where there is not much difference in linear expansion coefficient between the material used for forming the lens tube 214 and the materials used for forming the plastic lens 212 and the lenses 211 and 213, or where the lens tube 214 has a larger elasticity than the plastic lens 212 and the lenses 211 and 213, the lenses 211 and 213 and the plastic lens 212 may be fixed in position by caulking the lens tube 214. Further, the lenses 211 and 213 and the plastic lens 212 may be arranged to be held by a retaining ring or a C ring conventionally used for holding lenses.

Figure 20:
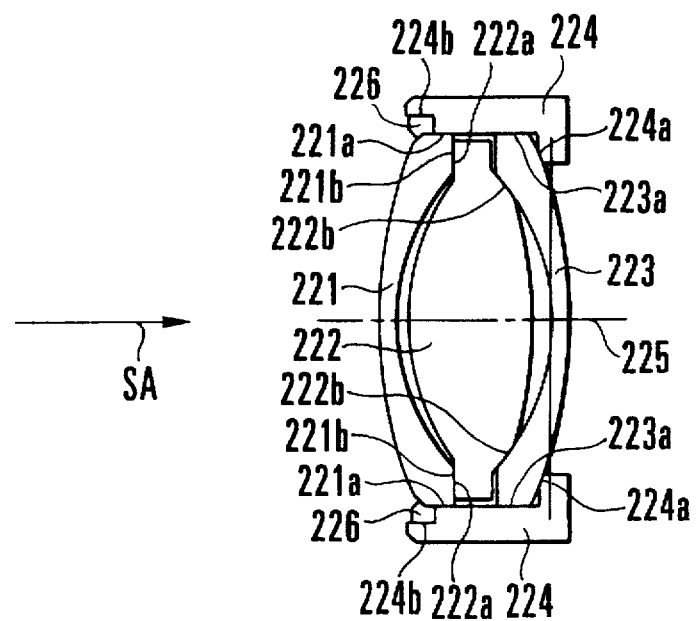
FIG. 20 is a sectional view showing essential parts of a seventeenth embodiment of this invention.

The seventeenth embodiment which is shown in FIG. 20 is next described as follows.

Referring to FIG. 20, lenses 221 and 223 each are made of a glass material. A lens 222 is made of a plastic material. A lens tube 224 is arranged to hold the lenses 221 and 223 and the plastic lens 222. Reference numeral 225 denotes an optical axis 225. Reference numeral 226 denotes an adhesive. The plastic lens 222 has a contact part 222a for contact with the lens 221 and a part 222b which has a curved surface of the same curvature as the left-side curved surface of the lens 223. The plastic lens 222 is in marginal contact with the lens 223 on its part 222b and the left-side curved surface of the lens 223.

The lens tube 224 has a receiving surface 224a which is curved at the same curvature as the right-side curved surface of the lens 223. The right-side curved surface of the lens 223 is in contact with the receiving surface 224a of the lens tube 224.

The lenses 221 and 223 respectively have fitting parts 221a and 223a which are arranged in the peripheral parts of these lenses 221 and 223 to be fitted into the lens tube 224. The lens 221 also has a contact part 221b while the plastic lens 222 has the contact part 222a as mentioned above. The lens tube 224 is provided with a space 224b for the adhesive 226 in addition to the receiving surface 224a for the lens 223. The plastic lens 222 is in contact with the lens 221 at the contact part 222a and in contact with the lens 223 at the part 222b in the direction of the optical axis 225. There is a clearance between the plastic lens 222 and the lens tube 224 in a direction perpendicular to the optical axis 225.

The seventeenth embodiment is assembled in the following manner. The lens 223 is first inserted into the lens tube 224 from the direction of arrow SA in such a way as to bring the lens surface of its right side into contact with the receiving surface 224a of the lens tube 224. The plastic lens 222 is next inserted from the direction of arrow SA to bring the part 222b into contact with the lens 223. Subsequently, the lens 221 is inserted from the direction of arrow SA to bring the contact part 221b of the lens 221 into contact with the contact part 222a of the plastic lens 222.

The plastic lens 222 might be deformed if the peripheral part of the plastic lens 222 is fitted into or inserted with pressure into the lens tube 224. To avoid such deformation, the outer diameter of the plastic lens 222 is arranged to be smaller than the inner diameter of the lens tube 224. When a load is applied to the lens 221 in the direction of arrow SA with the lens tube 224 fixed, the lens 221 moves to the right as viewed on the drawing in parallel to the optical axis 225 almost without slanting at all relative to the optical axis 225 as the lens 221 is fitted into the lens tube 224. The lens 221 thus comes into contact with the plastic lens 222.

When a load is applied further to the lens 221, the contact part 221b and the left-side curved surface of the plastic lens 223 restrict the movement of the plastic lens 222 to cause the plastic lens 222 to move perpendicular to the optical axis 225. As a result, there is obtained a state in which the centers of the lenses 221 and 223 and that of the plastic lens 222 coincide with the optical axis 225. (Since the outer diameter parts of the lenses 221 and 223 are fitted into the inner diameter part of the lens tube 224, their centers coincide with the optical axis 225.) Then, the adhesive 226 is injected into the space 224b to secure the lens 221 to the lens tube 224 to bring about a state as shown in FIG. 20.

Although the plastic lens 222 and the lens 223 are not fixed directly to the lens tube 224 with any adhesive or the like, the lenses 222 and 223 never deviate from their positions as they are sandwiched in between the lens 221 and the lens tube 224. Further, in a case where the coefficient of linear expansion of the plastic lens 222 greatly differs from that of the lens tube 224, the expansion and contraction of the plastic lens 222 due to heat or the like can be absorbed by the adhesive 226 with an elastic adhesive employed as the adhesive 226 as mentioned in the foregoing. The plastic lens 222 thus can be prevented from being deformed by heat or the like by the use of the elastic adhesive. Since no adhesive is applied directly to the plastic lens 222, the plastic lens 222 is not easily deformed by the setting of an adhesive.

In a case where there is not much difference in linear expansion coefficient between the material used for forming the lens tube 224 and the materials used for forming the plastic lens 222 and the lenses 221 and 223, or where the lens tube 224 has a larger elasticity than the lenses 222, 221 and 223, the lenses 221 and 223 and the plastic lens 222 may be fixed by caulking the lens tube 224. Further, the lenses 221 and 223 and the plastic lens 222 may be arranged to be held by a retaining ring or a C ring conventionally used for holding lenses.

In each of the embodiments described, at least one of a plurality of lenses which are in marginal contact with each other is arranged to be a plastic lens. However, this invention is not limited to the use of the plastic lens. A lens made of any other material may be used in place of the plastic lens as long as the lens shape of each embodiment described is obtainable.

The reason for arranging the lenses of each embodiment described to include at least one plastic lens lies in that the plastic lens can be easily manufactured in the specific shape of the embodiment and most saliently gives the effect of this invention. The effect of this invention, however, can be attained by using a lens made of a high rigidity material in place of the plastic lens for each of the embodiments described. Particularly, the recent advancement of technology for molding has come to permit the manufacture without much difficulty of a glass lens in the shape defined by each of the embodiments. The effect of this invention thus can be easily attained even if the plastic lens of each embodiment is replaced with a glass lens.

Therefore, the material for the plastic lens of each embodiment is not limited to a plastic material but the lens may be made of any other suitable material. Further, in each of the embodiments described, the two curved surfaces in marginal contact with each other are arranged such that one of them is formed on the side of the plastic lens to have the same curvature as that of the other. However, these marginal contact parts may be conversely arranged to form one of them on the side of the other lens to have the same curved surface as the curved surface of the plastic lens. Further, in the case of such modification, the plastic lens may be replaced with a lens made of some other material such as glass or the like, as mentioned above.

Further, the curved surfaces of the lenses are not limited to spherical surfaces but they may be formed in aspherical shapes. The clearance provided, perpendicular to the optical axis, between the lens which is to be moved perpendicular to the optical axis to cause its center to coincide with the optical axis and the lens tube which holds this lens may be arranged to be only in such a size that the worst dimensional errors within tolerance limits of the outer diameter of the lens and the inner diameter of the lens tube do not cause the lens and the lens tube to interfere with each other and that the outer diameter end part of the lens and the inner diameter end part of the lens tube are never caused to touch each other by the expansion or contraction of the lens due to changes in temperature and humidity or by the motion of the lens when the lens moves perpendicular to the optical axis to come to a position where its center coincides with the optical axis.

In each of the sixth to seventeenth embodiments, the marginal contact parts of the lenses are arranged to be in shapes of plane or faces, so that their contacting forces in the direction of the optical axis can be dispersed to prevent concentration of stress on the lenses. The lenses thus can be adequately held in marginal contact with their centers accurately coinciding with the optical axis, even in the case of such lenses as plastic lenses that have been impossible to hold them in marginal contact by the conventional arrangement. Since a plurality of lenses are positioned through their curved surface parts which are most precisely arranged among other lens parts, each of these embodiments is capable of more accurately causing their lens centers to coincide with the optical axis, without necessitating a lens position adjusting action, than the conventional method for holding lenses in marginal contact.

According to the invented method, in the case of the marginal contact of a plastic lens and a lens made of a high rigidity material such as glass, the lens barrel is assembled by inserting the glass lens after the plastic lens is inserted into the lens tube and then the lens is secured to the lens tube by means of an adhesive, a C ring or a retaining ring and by caulking the lens tube. Therefore, a lens fixing force is not directly exerted on the plastic lens, so that the optical performance of the lens barrel can be prevented from being deteriorated by the deformation of the plastic lens or by the distortion of the curved surface of the plastic lens.

In securing the lens to the lens tube with an adhesive, if the adhesive is of the kind having elasticity when the adhesive is in process of setting, the elastic adhesive serves to absorb the expansion and contraction of the plastic lens caused to take place in the direction of the optical axis by changes in temperature and humidity. The use of the elastic adhesive, therefore, effectively prevents deformation and distortion of the plastic lens. Further, in a case where a plastic lens is arranged to be in marginal contact with another plastic lens, use of such an adhesive that does not much contract at the time of setting for fixing the plastic lens and the lens tube prevents the plastic lens from being easily deformed or distorted.

According to this invention, of a plurality of lenses arranged to be in marginal contact, the lens which is other than the one moving perpendicular to the optical axis to a position where its center coincide with the optical axis and the lens tube which holds this lens are provided with a guide part for moving them relative to each other in parallel to the optical axis and also a positioning part for positioning in the direction perpendicular to the optical axis. The optical axes of the plurality of lenses which are in marginal contact with each other and the optical axis of the lens tube, therefore, can be caused to coincide with each other without slanting them relative to each other.

Further, according to this invention, a lens which has a surface extending perpendicular to the optical axis for movement perpendicular to the optical axis and a lens which has a curved surface part formed in its peripheral part to have the same curved surface as the marginal contact side of a lens to be in marginal contact therewith can be formed by molding. Therefore, these lenses can be easily manufactured. The ease of manufacture can be enhanced further by arranging these lenses to be plastic lenses. This advantage in addition to the advantages mentioned in the foregoing greatly enhances the advantageous effect of this invention.

The receiving face of the lens tube is curved at the same curvature as the curved surface of the lens which is in contact with the receiving face. The contacting lens has a curved surface part formed in a peripheral part on the other side of it to have the same curvature as the curved surface of another lens. The other lens and the lens tube jointly form a guide-and-positioning part for guiding in parallel to the optical axis and for a positioning movement perpendicular to the optical axis. The optical axes of the plurality of lenses thus can be brought into a state in which they coincide with the optical axis of the lens tube by causing the other lens to engage the lens tube.

Further, according to this invention, between two lenses which engage the lens tube with their optical axes coinciding with the optical axis of the lens tube, another lens is arranged to be in contact with the lens surfaces of the two lenses and to be positioned at least by the curved lens surface of one of the two lenses, or a curved lens surface part which is sandwiched in between the two lenses is provided in a peripheral part of the lens surface of at least one of the two lenses. By virtue of this arrangement, a plurality of lenses in contact with each other can be brought into a state in which thier optical axes coincide with the optical axis of the lens tube without causing them to slant relative to each other.

What is claimed is:

1. A lens barrel comprising:
   a first lens; and
   a second lens,
   wherein respective peripheral parts of said first and second lenses are in contact with each other, and respective central parts of said first and second lenses are distant from each other, and
   wherein one of the peripheral parts of said first and second lenses has a concave curved surface and the other has a convex curved surface, and the concave and convex curved surfaces substantially have the same curvature.

2. A lens barrel according to claim 1, wherein said first lens is made of glass and said second lens is made of plastic.

3. A lens barrel according to claim 1, wherein each of said first lens and said second lens is made of glass.

4. A lens barrel according to claim 1, wherein each of said first lens and said second lens is made of plastic.

5. A lens barrel according to claim 1, wherein said first lens is a bi-convex lens and said second lens is a meniscus lens having a concave surface facing said first lens.

6. A lens barrel according to claim 1, wherein said first lens is a bi-concave lens and said second lens is a meniscus lens having a concave surface facing said first lens.

7. A lens barrel according to claim 1, wherein said first lens and said second lens are meniscus lenses having respective concave surfaces toward the same direction.

8. A lens barrel according to claim 1, further comprising a tube arranged to hold said first lens and said second lens, wherein said first lens is made of plastic and has an outer diameter smaller than an inner diameter of a corresponding part of said tube, and wherein said first lens is sandwiched in between a receiving part of said tube and said second lens.

9. A lens barrel according to claim 8, wherein said second lens is made of glass.

10. A lens barrel according to claim 8, wherein said second lens is made of plastic.

11. A lens barrel according to claim 8, wherein each of said receiving part of said tube and a contact part of said first lens which is in contact with said receiving part has a curved surface, and the respective curved surfaces of said receiving part and said contact part have the same curvature.

12. A lens barrel according to claim 11, wherein said second lens is fitted into a corresponding part of said tube.

13. A lens barrel according to claim 12, wherein said second lens is secured to said tube by an adhesive.

14. A lens barrel according to claim 1, further comprising a tube arranged to hold said first lens and said second lens, wherein said first lens has a lower rigidity than said second lens and has an outer diameter smaller than an inner diameter of a corresponding part of said tube, and wherein said first lens is sandwiched in between a receiving part of said tube and said second lens.

15. A lens barrel according to claim 14, wherein each of said receiving part of said tube and a contact part of said first lens which is in contact with said receiving part has a curved surface, and the respective curved surfaces of said receiving part and said contact part have the same curvature.

16. A lens barrel according to claim 14, wherein said second lens is fitted into a corresponding part of said tube.

17. A lens barrel according to claim 16, wherein said second lens is secured to said tube by an adhesive.

18. A lens barrel according to claim 1, further comprising a third lens and a tube arranged to hold said first lens, said second lens and said third lens, wherein said first lens is made of plastic and has an outer diameter smaller than an inner diameter of a corresponding part of said tube, and wherein said first lens is sandwiched in between said second lens and said third lens.

19. A lens barrel according to claim 18, wherein each of said receiving part of said tube and a contact part of said third lens which is in contact with said receiving part has a curved surface, and the respective curved surfaces of said receiving part and said contact part have the same curvature.

20. A lens barrel according to claim 18, wherein respective peripheral parts of said second lens and said third lens are in contact with each other, and respective central parts of said second lens and said third lens are distant from each other, and wherein each of the respective peripheral parts of said second lens and said third lens has a curved surface, and the respective curved surfaces of said second lens and said third lens substantially have the same curvature.

21. A lens barrel according to claim 1, wherein said first lens has a first surface on an incidence side and a second surface on an emission side, and the peripheral part of said first lens is provided on one side of the first and second surfaces and is curved on the same side as the one of the first and second surfaces with the same curvature.

22. A lens barrel according to claim 1, wherein said first lens has a first surface on an incidence side and a second surface on an emission side and the peripheral part of said first lens is provided on one of the first and second surfaces and has a curvature different from that of said one of the first and second surfaces, and said second lens has a third surface on the incidence side and a fourth surface on the emission side, and the peripheral part of said second lens is provided on one of the third and fourth surfaces and has a curvature different from that of said one of the third and fourth surfaces.

23. A lens barrel according to claim 1, wherein the concave and convex curved surfaces have the same curvature.

24. A lens barrel comprising:

a lens; and a tube for holding said lens, said tube having a receiving part arranged to receive a curved surface of said lens, wherein the receiving part of said tube has a curved surface, and wherein one of the curved surfaces of said tube and said lens is a concave curved surface and the other is a convex curved surface, and the concave and convex curved surfaces substantially have the same curvature, and wherein the receiving part having the curved surface is arranged to receive the curved surface of said lens without caulking.

25. A lens barrel according to claim 24, wherein an outer diameter of said lens is smaller than an inner diameter of a corresponding part of said tube.

26. A lens barrel according to claim 25, wherein said lens is sandwiched in between the receiving part of said tube and a peripheral part of another lens.

27. A lens barrel according to claim 26, wherein said lens is made of plastic.

28. A lens barrel according to claim 26, wherein said lens is made of glass.

29. A lens barrel according to claim 26, wherein said lens is a meniscus lens.

30. A lens barrel according to claim 26, wherein said lens is a bi-convex lens.

31. A lens barrel according to claim 26, wherein said lens is a bi-concave lens.

32. A lens barrel according to claim 24, wherein the concave and convex curved surfaces have the same curvature.

33. A lens barrel comprising:

a first lens;

a second lens;

a tube arranged to hold said first lens and said second lens, wherein an outer diameter of said first lens is smaller than an inner diameter of a corresponding part of said tube, and said first lens is held by sandwiching said first lens between said second lens and a receiving part of said tube, wherein respective peripheral parts of said first and second lenses are in contact with each other, and wherein one of the peripheral parts of said first and second lenses has a concave curved surface and the other has a convex curved surface, and the concave and convex curved surfaces substantially have the same curvature.

34. A lens barrel according to claim 33, wherein said first lens is made of plastic.

35. A lens barrel according to claim 34, wherein said second lens is made of glass.

36. A lens barrel according to claim 35, wherein the receiving part of said tube has a curved surface for receiving a curved surface of said first lens, and the respective curved surfaces of the receiving part and said first lens substantially have the same curvature.

37. A lens barrel according to claim 33, wherein the concave and convex curved surfaces have the same curvature.

38. An optical apparatus comprising:
a first lens;
a second lens; and
a tube arranged to hold said first lens and said second lens,
wherein an outer diameter of said first lens is smaller than an inner diameter of a corresponding part of said tube, and said first lens is held by sandwiching said first lens in between said second lens and a receiving part of said tube,
wherein respective peripheral parts of said first and second lenses are in contact with each other, and wherein one of the peripheral parts of said first and second lenses has a concave curved surface and the other has a convex curved surface, and the concave and convex curved surfaces substantially have the same curvature.

39. An apparatus according to claim 38, wherein said first lens is made of plastic.

40. An apparatus according to claim 39, wherein said second lens is made of glass.

41. An apparatus according to claim 40, wherein the receiving part of said tube has a curved surface for receiving a curved surface of said first lens, and the respective curved surfaces of the receiving part and said first lens substantially have the same curvature.

42. An apparatus according to claim 38, wherein said apparatus is a camera.

43. An apparatus according to claim 38, wherein said apparatus is an interchangeable lens.

44. An optical apparatus according to claim 38, wherein the concave and convex curved surfaces have the same curvature.

45. An optical apparatus comprising:
a first lens; and
a second lens,
wherein respective peripheral parts of said first and second lenses are in contact with each other, and respective central parts of said first and second lenses are distant from each other, and
wherein one of the peripheral parts of said first and second lenses has a concave curved surface and the other has a convex curved surface, and the concave and convex curved surfaces substantially have the same curvature.

46. An apparatus according to claim 45, wherein said first lens is made of glass and said second lens is made of plastic.

47. An apparatus according to claim 45, wherein each of said first lens and said second lens is made of glass.

48. An apparatus according to claim 45, wherein each of said first lens and said second lens is made of plastic.

49. An apparatus according to claim 45, wherein said first lens is a bi-convex lens and said second lens is a meniscus lens having a concave surface facing said first lens.

50. An apparatus according to claim 45, wherein said first lens is a bi-concave lens and said second lens is a meniscus lens having a concave surface facing said first lens.

51. An apparatus according to claim 45, wherein said first lens and said second lens are meniscus lenses having respective concave surfaces toward the same direction.

52. An apparatus according to claim 45, further comprising a tube arranged to hold said first lens and said second lens, wherein said first lens is made of plastic and has an outer diameter smaller than an inner diameter of a corresponding part of said tube, and wherein said first lens is sandwiched in between a receiving part of said tube and said second lens.

53. An apparatus according to claim 52, wherein said second lens is made of glass.

54. An apparatus according to claim 52, wherein said second lens is made of plastic.

55. An apparatus according to claim 52, wherein each of said receiving part of said tube and a contact part of said first lens which is in contact with said receiving part has a curved surface, and the respective curved surfaces of said receiving part and said contact part have the same curvature.

56. An apparatus according to claim 55, wherein said second lens is fitted into a corresponding part of said tube.

57. An apparatus according to claim 56, wherein said second lens is secured to said tube by an adhesive.

58. An apparatus according to claim 45, further comprising a tube arranged to hold said first lens and said second lens, wherein said first lens has a lower rigidity than said second lens and has an outer diameter smaller than an inner diameter of a corresponding part of said tube, and wherein said first lens is sandwiched in between a receiving part of said tube and said second lens.

59. An apparatus according to claim 58, wherein each of said receiving part of said tube and a contact part of said first lens which is in contact with said receiving part has a curved surface, and the respective curved surfaces of said receiving part and said contact part have the same curvature.

60. An apparatus according to claim 58, wherein said second lens is fitted into a corresponding part of said tube.

61. An apparatus according to claim 60, wherein said second lens is secured to said tube by an adhesive.

62. An apparatus according to claim 45, further comprising a third lens and a tube arranged to hold said first lens, said second lens and said third lens, wherein said first lens is made of plastic and has an outer diameter smaller than an inner diameter of a corresponding part of said tube, and wherein said first lens is sandwiched in between said second lens and said third lens.

63. An apparatus according to claim 62, wherein each of said receiving part of said tube and a contact part of said third lens which is in contact with said receiving part has a curved surface, and the respective curved surfaces of said receiving part and said contact part have the same curvature.

64. An apparatus according to claim 62, wherein respective peripheral parts of said second lens and said third lens are in contact with each other, and respective central parts of said second lens and said third lens are distant from each other, and wherein each of the respective peripheral parts of said second lens and said third lens has a curved surface, and the respective curved surfaces of said second lens and said third lens substantially have the same curvature.

65. An apparatus according to claim 45, wherein said first lens has a first surface on an incidence side and a second surface on an emission side, and the peripheral part of said first lens is provided on one side of the first and second surfaces and is curved on the same side as the one of the first and second surfaces with the same curvature.

66. An apparatus according to claim 45, wherein said first lens has a first surface on an incidence side and a second surface on an emission side and the peripheral part of said first lens is provided on one of the first and second surfaces and has a curvature different from that of said one of the first and second surfaces, and said second lens has a third surface on the incidence side and a fourth surface on the emission side, and the peripheral part of said second lens is provided on one of the third and fourth surfaces and has a curvature different from that of said one of the third and fourth surfaces.

67. An apparatus according to claim 45, wherein said apparatus is a camera.

68. An apparatus according to claim 45, wherein said apparatus is an interchangeable lens.

69. An optical apparatus according to claim 45, wherein the concave and convex curved surfaces have the same curvature.

70. An optical apparatus comprising:

a lens; and a tube for holding said lens, said tube having a receiving part arranged to receive a curved surface of said lens, wherein the receiving part has a curved surface, and wherein one of the curved surfaces of said tube and said lens is a concave curved surface and the other is a convex curved surface, and the concave and convex curved surfaces substantially have the same curvature, and wherein the receiving part having the curved surface is arranged to receive the curved surface of said lens without caulking.

71. An apparatus according to claim 70, wherein an outer diameter of said lens is smaller than an inner diameter of a corresponding part of said tube.

72. An apparatus according to claim 71, wherein said lens is sandwiched in between the receiving part of said tube and a peripheral part of another lens.

73. An apparatus according to claim 72, wherein said lens is made of a plastic material.

74. An apparatus according to claim 72, wherein said lens is made of glass.

75. An apparatus according to claim 72, wherein said lens is a meniscus lens.

76. An apparatus according to claim 72, wherein said lens is a bi-convex lens.

77. An apparatus according to claim 72, wherein said lens is a bi-concave lens.

78. An apparatus according to claim 70, wherein said apparatus is a camera.

79. An apparatus according to claim 70, wherein said apparatus is an interchangeable lens.

80. An optical apparatus according to claim 70, wherein the concave and convex curved surfaces have the same curvature.

* * * * *

UNITED STATES PATENT AND TRADEMARK OFFICE
CERTIFICATE OF CORRECTION

PATENT NO.: 5,798,876
DATED : August 25, 1998
INVENTOR(S) : Masatoshi NAGANO

It is certified that error appears in the above-identified patent and that said Letters Patent is hereby corrected as shown below:

COLUMN 11:

Line 35, "apparatuses" should read --apparatus--.

COLUMN 24:

Line 12, "lenses" should read --lens--; and
Line 16, "lens 211" should read --lenses 211--.

COLUMN 28:

Line 4, "coincide" should read --coincides--.

Signed and Sealed this

Eighth Day of June, 1999

Attest:

Q. TODD DICKINSON

*Attesting Officer*     *Acting Commissioner of Patents and Trademarks*